(12) United States Patent
Washiro

(10) Patent No.: US 8,013,795 B2
(45) Date of Patent: *Sep. 6, 2011

(54) COMMUNICATION SYSTEM AND COMMUNICATION APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,355

(22) Filed: May 21, 2010

(65) Prior Publication Data

US 2010/0233958 A1  Sep. 16, 2010

Related U.S. Application Data

(63) Continuation of application No. 11/838,698, filed on Aug. 14, 2007, now Pat. No. 7,750,851.

(30) Foreign Application Priority Data

Nov. 21, 2006 (JP) ................................ 2006-314458
Jun. 4, 2007 (JP) ................................ 2007-148671

(51) Int. Cl.
  *H01Q 1/38* (2006.01)
(52) U.S. Cl. .................................. 343/700 MS; 343/850
(58) Field of Classification Search ........... 343/700 MS, 343/702, 850, 852, 853
See application file for complete search history.

(56) References Cited

U.S. PATENT DOCUMENTS

| | | | |
|---|---|---|---|
| 2002/0024465 A1* | 2/2002 | Kawahata et al. | 343/700 MS |
| 2002/0030630 A1 | 3/2002 | Maeda et al. | |
| 2004/0027287 A1 | 2/2004 | Onaka et al. | |
| 2010/0238081 A1* | 9/2010 | Achour et al. | 343/753 |

FOREIGN PATENT DOCUMENTS

| | | |
|---|---|---|
| CN | 1595813 A | 3/2005 |
| CN | 1720672 A | 1/2006 |
| JP | 06-260815 | 9/1994 |
| JP | 9-18393 | 1/1997 |
| JP | 11-088039 | 3/1999 |
| JP | 2000-134028 | 5/2000 |
| JP | 2001-060823 | 3/2001 |
| JP | 2004-200941 | 7/2004 |
| JP | 2004-214879 | 7/2004 |
| JP | 2005-18671 | 1/2005 |

(Continued)

OTHER PUBLICATIONS

T. Teshirogi et al., "Modern millimeter-wave technologies," p. 119.
A. Toshimi, "A study of surface wave propagating two parallel ferrite rods."
Y. Mushiake, "Antenna Denpa Denpan (Antenna/Radio-Wave Propagation)," pp. 16-18 (1985).

(Continued)

*Primary Examiner* — HoangAnh T Le
(74) *Attorney, Agent, or Firm* — Finnegan, Henderson, Farabow, Garrett & Dunner, L.L.P.

(57) ABSTRACT

A communication system includes the following elements: a transmitter including a transmission circuit unit configured to generate an RF signal for transmitting data and an EFC antenna configured to transmit the RF signal as an electrostatic field or an induced electric field; and a receiver including an EFC antenna and a reception circuit unit configured to receive and process the RF signal received by the EFC antenna. The EFC antennas of the transmitter and the receiver each include a coupling electrode and a resonating section including a distributed-constant circuit configured to strengthen electrical coupling between the coupling electrodes. The RF signal is transmitted by electric-field coupling between the EFC antennas, facing each other, of the transmitter and the receiver.

15 Claims, 26 Drawing Sheets

FOREIGN PATENT DOCUMENTS

| | | |
|---|---|---|
| JP | 2005-051584 | 2/2005 |
| JP | 2005-160009 | 6/2005 |
| JP | 2005-198335 | 7/2005 |
| JP | 2005-217962 | 8/2005 |
| JP | 2005-269592 | 9/2005 |
| JP | 2006-60283 | 3/2006 |
| JP | 2006-106612 | 4/2006 |
| JP | 2006-148568 | 6/2006 |
| WO | WO 2004/032363 | 4/2004 |

OTHER PUBLICATIONS

M. Nakajima, "Microwave engineering," pp. 182-190.
Office Action mailed Nov. 2, 2010, in the Patent Office of the People's Republic of China for corresponding Chinese Patent Application No. 2007/10142337.6 (15 pages, including translation).
Abstract of Chinese Patent Application No. CN 1595813A.
Abstract of Chinese Patent Application No. CN 1720672A.

* cited by examiner

PROPAGATION LOSS BETWEEN EFC ANTENNAS
(ORIENTATION 0 DEGREES)

PROPAGATION LOSS BETWEEN EFC ANTENNAS
(ORIENTATION 90 DEGREES)

PROPAGATION LOSS BETWEEN LINEAR POLARIZATION ANTENNAS (ORIENTATION 0 DEGREES)

PROPAGATION LOSS BETWEEN LINEAR POLARIZATION ANTENNAS (ORIENTATION 90 DEGREES)

COMMUNICATION SYSTEM AND COMMUNICATION APPARATUS

CROSS REFERENCES TO RELATED APPLICATIONS

This is a continuation of U.S. application Ser. No. 11/838,698, filed Aug. 14, 2007 now U.S. Pat. No. 7,750,851, and claims the benefit of priority of Japanese Patent Applications No. JP 2006-314458, filed in the Japanese Patent Office on Nov. 21, 2006, and Japanese Patent Application No. JP 2007-148671 filed in the Japanese Patent Office on Jun. 4, 2007, the entire contents the disclosures of both of which are incorporated herein by reference in their entirety.

BACKGROUND OF THE INVENTION

1. Field of the Invention

The present invention relates to communication systems and communication apparatuses for communicating a large amount of data between information devices, and more particularly to a communication system and a communication apparatus for performing data communication between information devices without interfering with other communication systems by using an electrostatic field or an induced electric field.

More specifically, the present invention relates to a communication system and a communication apparatus for transmitting an ultra-wideband (UWB) communication signal between information devices disposed at a very short distance using an electrostatic field or an induced electric field, and more particularly to a communication system and a communication apparatus for enabling high-capacity transmission by efficiently transmitting a radio-frequency (RF) signal between electric-field-coupling antennas (hereinafter called "EFC antenna") of information devices using an electrostatic field or an induced electric field over a very short distance.

2. Description of the Related Art

Recently, the use of wireless interfaces in transferring data between small information devices, such as when image data or music data is exchanged between a small information device and a personal computer (PC), is becoming more widespread in place of data transmission using a general cable, such as an audio/visual (AV) cable or a universal serial bus (USB) cable, to interconnect the information devices or using a medium such as a memory card. Wireless interfaces are user-friendlier because they do not involve the reconnection of connectors and the wiring of a cable every time data transmission is performed. Various information devices having cableless communication functions are now available.

As methods of cableless data transmission between small devices, besides wireless local area networks (LANs) represented by the Institute of Electrical and Electronics Engineers (IEEE) 802.11 and Bluetooth® communication, radio communication schemes of performing transmission/reception of radio signals using antennas have been developed.

A communication scheme referred to as "ultra-wideband" (UWB), which has been drawing increasing attention in recent years, is a wireless communication technology for implementing high-capacity wireless data transmission at approximately 100 Mbs, though over a short distance, using a very wide frequency band from 3.1 GHz to 10.6 GHz. Therefore, a large amount of data, such as a moving image or music data contained in one compact disc (CD), can be transferred at high speed in a short period of time.

The UWB communication has a communication distance of approximately 10 m due to its relationship with transmission power. Using UWB, a short-distance wireless communication scheme, such as a personal area network (PAN), may be configured. For example, in IEEE 802.15.3 or the like, the scheme of transmitting data having a packet structure including a preamble is designed as an access control scheme in the UWB communication. Intel Corporation in the United States is studying, as a UWB application, a wireless version of USB, which has been widely used as a general interface for PCs.

UWB transmission systems using a UWB low-band from 3.1. GHz to 4.9 GHz have been actively developed taking into consideration that the UWB communication can transfer data at a rate exceeding 100 Mbps without occupying a transmission band from 3.1 GHz to 10.6 GHz, and the simplicity of fabricating an RF circuit. The inventor of the present invention believes that a data transmission system employing a UWB low-band is one of effective wireless communication techniques to be applied to mobile devices. For example, high-speed data transmission in a short-distance area, such as an ultra-high-speed, short-distance device area network (DAN) including a storage device, can be implemented.

In the case where the strength of an electric field (the strength of radio waves) at a distance of 3 m from a wireless facility is less than or equal to a predetermined level, that is, in the case where very weak radio waves merely causing noise for other wireless systems existing in the neighborhood are emitted, the licensing of a radio station is unnecessary (for example, see the Regulations for the Enforcement of the Radio Law, Article 6(1-1) (Regulation No. 14, Radio Regulatory Committee, 1950)). Therefore, the development and production cost of a wireless system can be reduced. Due to its relationship with transmission power, the above-described UWB communication can implement a short-distance wireless communication system at a relatively low electric-field level. However, in the case of a UWB communication system using a radio communication scheme of performing transmission and reception of radio signals using antennas, en electric field generated therein is difficult to be suppressed to a very weak level.

Many known wireless communication systems employ radio communication schemes and allow signals to propagate using a radiated electric field generated in the case where current flows through an aerial (antenna). In this case, a transmitter side emits radio waves regardless of the presence of a communication partner. This may generate jamming waves which disturb the neighboring communication systems. An antenna at a receiver side receives not only desired waves from the transmitter, but also radio waves arriving from far away. Thus, the antenna at the receiver side is susceptible to the influence of ambient jamming waves, resulting in a reduction of the reception sensitivity. In the case where a plurality of communication partners exists, a complicated setting is necessary to be done in, order to select a desired communication partner from the plurality of communication partners. For example, in the case where a plurality of pairs of wireless devices perform wireless communication within a narrow range, division multiplexing such as frequency selection is necessary to be done in order to perform communication that does not interfere with other pairs of wireless devices. Since a radio wave perpendicular to the direction of polarization is not communicated, the directions of polarization of the antennas of the transmitter and the receiver are necessary to be aligned.

For example, in the case of a contactless data communication system in which communication is performed within a very short distance from a few millimeters to a few centimeters, it is preferable that the transmitter and the receiver be coupled strongly within a short distance, but a signal not reach across a long distance in order to avoid interference with other systems. It is also preferable that data communication devices be coupled with each other regardless of the orientations (directions) thereof in the case where the data communication devices are placed in close proximity with each other, that is, it is preferable that the devices have no directivity. In order to perform high-capacity data communication, it is preferable that the devices can perform broadband communication.

In wireless communication, besides the above-mentioned radio communication using a radiated electric field, various communication schemes using an electrostatic field or an induced electric field are available. For example, an electric-field coupling scheme or an electromagnetic-induction scheme is employed in existing contactless communication systems mainly used in radio frequency identification (RFID). An electrostatic field or an induced electric field is inversely proportional to the cube or the square of the distance from the source thereof. Therefore, very weak radio waves in which the strength of an electric field (strength of radio waves) is less than or equal to a predetermined level at a distance of 3 m from a wireless facility can be emitted, and hence the licensing of a radio station is unnecessary. In this type of contactless communication system, a transmission signal is rapidly attenuated according to the distance. In the case where no nearby communication partner exists, no coupling relationship occurs, and hence other communication systems are not disturbed. Even in the case where radio waves arrive from far away, an EFC antenna receives no radio waves, and hence the present system is not interfered with by other communication systems. That is, contactless, very-short-distance communication using electric field coupling employing an induced electric field or an electrostatic field is suitable for emitting very weak radio waves.

Contactless, very-short-distance communication systems have some advantages over general wireless communication systems. For example, in the case where a radio signal is exchanged between devices located at a relatively long distance, the quality of the radio signal in a radio range is deteriorated due to a neighboring reflector or an increase in the communication distance. In contrast, short-distance communication is not dependent on its surrounding environment and can transfer a high-quality signal with a low error rate at a high transfer rate. In a very-short-distance communication system, there is no chance for an unauthorized device to intercept transmission data. Therefore, it is unnecessary to take into consideration prevention of hacking on a transmission line and securing of confidentiality.

In radio communication, it is necessary for an antenna to have a size of approximately one-half or one-fourth of its operating wavelength $\lambda$, which leads to an increase in the size of an apparatus. In contrast, there are no such limitations in a very-short-distance communication system using an induced electromagnetic field or an electrostatic magnetic field.

For example, a proposal for an RFID tag system has been made (for example, see Japanese Unexamined Patent Application Publication No. 2006-60283). In this system, pairs of communication auxiliary units are arranged so that RFID tags are positioned between a plurality of communication auxiliary units. By arranging RFID tags attached to a plurality of merchandise items so as to be sandwiched between the communication auxiliary units, stable reading and writing of information can be implemented even in the case where RFID tags overlap one another.

A proposal for a data communication apparatus using an induced magnetic field has been made (for example, see Japanese Unexamined Patent Application Publication No. 2004-214879). The apparatus includes a main body, a mounting tool configured to mount the main body to a physical body of a user, an antenna coil, and a data communication unit configured to perform contactless data communication with an external communication apparatus via the antenna coil. The antenna coil and the data communication unit are placed on an outer casing provided above the main body of the apparatus.

A proposal has been made for a cellular phone, which is en exemplary portable information device, provided with an RFID, which ensures a communication distance without sacrificing the portability (for example, see Japanese. Unexamined Patent Application Publication No. 2005-18671). A memory card to be inserted into the portable information device includes an antenna coil configured to perform data communication with an external device. An RFID antenna coil is provided in the exterior of a memory-card insertion slot of the portable information device.

Because known RFID systems employing an electrostatic field or an induced electric field use lower-frequency signals, the systems communicate at a low speed and are thus not suitable for high-capacity data transmission. In the case of communication scheme using an electromagnetic field induced by an antenna coil, no communication can be performed in the case where a metal plate is positioned behind the coil. A large planar area is necessary for mounting the coil. Such mounting problems are found in this type of communication scheme. Further, a transmission line has a large loss, and hence the signal transmission efficiency is poor.

In contrast, the inventor of the present invention believes that high-speed data transmission taking into consideration confidentiality can be implemented by emitting a very weak electric field which does not call for the licensing of a wireless station in a very-short-distance communication system for transmitting an RF signal using electric-field coupling, that is, transmitting the above-mentioned UWB communication signal by employing an electrostatic field or an induced electromagnetic field. The inventor of the present invention believes that, in the UWB communication system using an electrostatic field or an induced electric field, a large amount of data, such as a moving image or music data contained in one CD, can be transferred at high speed in a short period of time.

In known RFID systems, electrodes (EFC antennas) of a transmitter and a receiver are generally attached to each other, which is inconvenient for a user. It is thus desirable to perform short-distance communication in which the electrodes are separated by a distance of approximately 3 cm.

In an electrostatic coupling scheme using signals in a relatively low frequency band, the 3-cm distance between the electrodes of the transmitter and the receiver is negligible relative to the wavelength, and the propagation loss between the transmitter and the receiver is not a serious problem. However, when transmitting a higher-frequency wideband signal such as a UWB signal, a distance of 3 cm corresponds to approximately one-half of the wavelength of an operating frequency of 4 GHz. Since the propagation loss occurs in accordance with the propagation distance relative to the wavelength, the distance between the electrodes of the transmitter and the receiver is considerably long relative to the wavelength. Therefore, the propagation loss should be sufficiently suppressed in the case where a UWB signal is transmitted using electrostatic coupling.

In the technical field of wireless description, frequency modulation is generally applied to wideband radio signals to be transmitted. In the UWB transmission scheme, direct sequence spread spectrum (DSSS)-UWB, which is a scheme in which the spreading rate of a direct spread (DS) information signal is increased to maximum, and orthogonal frequency division multiplexing (OFDM)-UWB, which uses an OFDM modulation scheme, are defined. According to DSSS, if communication at a particular frequency is difficult to perform due to noise, communication using another frequency can be performed. Therefore, radio waves are less likely to be interrupted. According to the OFDM modulation scheme, communication is resistant to interference and noise even in the case where a plurality of channels is used.

In a very-short-distance communication system in which a UWB communication signal is transmitted using the above-described electric-field coupling employing an electrostatic field or an induced electric field, in the case where a frequency spread scheme such as DSSS is used, not only electrostatic coupling is necessary to be established in an RF band between EFC antennas of a transmitter and a receiver, but also the EFC antennas are necessary to be designed to operate effectively over a wideband.

In the case where each EFC antenna is accommodated in a casing of a device, the center frequency may be shifted due to the influence of a surrounding metal component. In view of this point, the couples for establishing electric-field coupling should be designed in advance to operate effectively over wide frequencies.

SUMMARY OF THE INVENTION

It is desirable to provide an excellent communication system and communication apparatus that can perform high-capacity data communication between information devices using a UWB communication scheme employing an RF wideband signal.

It is also desirable to provide an excellent communication system and communication apparatus that can transmit a UWB communication signal between information devices placed at a very short distance by using an electrostatic field (quasi-electrostatic field) or an induced electric field.

It is also desirable to provide an excellent communication system and communication apparatus that can perform high-capacity transmission by efficiently transmitting an RF signal between EFC antennas of information devices using an electrostatic field or an induced electric field over a very short distance.

It is also desirable to provide an excellent communication system and communication apparatus that can perform high-capacity transmission by forming a noise-resistant electric-field-coupling transmission line which establishes electric-field coupling in an RF band between EFC antennas of a transmitter and a receiver and operates effectively over a wideband.

According to an embodiment of the present invention, there is provided a communication system including the following elements: a transmitter including a transmission circuit unit configured to generate an RF signal for transmitting data and an EFC antenna configured to transmit the RF signal as an electrostatic field or an induced electric field; and a receiver including an EFC antenna and a reception circuit unit configured to receive and process the RF signal received by the EFC antenna. The EFC antennas of the transmitter and the receiver each include a coupling electrode and a resonating section including a distributed-constant circuit configured to strengthen electrical coupling between the coupling electrodes. The RF signal is transmitted by electric-field coupling between the EFC antennas, facing each other, of the transmitter and the receiver.

The "system" mentioned here refers to a logical assembly of a plurality of devices (or function modules that realize specific functions) and does not make any distinction between whether or not the devices or the function modules are contained in a single casing (the same applies hereinafter).

User-friendliness is improved in the case where data transfer between small information devices, such as when data including images or music is exchanged between a small information device and a PC, is implemented in a cableless manner. However, many wireless communication systems represented by wireless LANs use a radiated electric field generated by allowing current to flow through an antenna. Therefore, radio waves are emitted regardless of the presence of a communication partner. Since the radiated electric field is attenuated gradually in inverse proportion to the distance from the antenna, a signal reaches relatively far. This may generate jamming waves which disturb the neighboring communication systems. Due to the surrounding jamming waves, the sensitivity of an antenna at a receiver side is reduced. In short, it is difficult to implement wireless communication using a radio communication scheme in which a communication partner is limited to that located at a very short distance.

In contrast, in a communication system using an electrostatic field or an induced electric field, no coupling relationship occurs in the case where no nearby communication partner exists. The strength of an induced electric field or an electrostatic field is rapidly attenuated in inverse proportion to the square or the cube of the distance from the source thereof. That is, no unnecessary electric fields are generated, and electric fields do not reach far, whereby other communication systems are not disturbed. Even in the case where radio waves arrive from far away, the coupling electrode receives no radio waves, and hence the system is not interfered with by other communication systems. However, this type of known communication system has low communication speed because of using a lower-frequency signal and is thus unsuitable for high-capacity data transmission. In the case of a communication scheme using an induced electromagnetic field, a large planar area is necessary for mounting a coil. Such mounting problems are found in this type of communication scheme.

In contrast, the communication system according to the embodiment of the present invention is configured to transmit a UWB signal between the transmitter configured to generate a UWB signal for transmitting data and the receiver configured to receive and process the UWB signal by establishing electric-field coupling between the EFC antennas of the transmitter and the receiver. Since an electrostatic field and an induced electric field are attenuated in inverse proportion to the cube and the square, respectively, of the distance, very weak radio waves which do not call for the licensing of a wireless station can be emitted. It is also unnecessary to take into consideration prevention of hacking on a transmission line and securing of confidentiality. Because the communication system performs the UWB communication, high-capacity communication over a very short distance can be implemented. For example, a large amount of data, such as a moving image or music data contained in one CD, can be transferred at high speed in a short period of time.

Since an RF circuit incurs propagation loss in accordance with the propagation distance relative to the wavelength, it is necessary to sufficiently suppress the propagation loss in the case where an RF signal, such as a UWB signal, is transmitted.

In the communication system according to the embodiment of the present invention, in the transmitter, an RF-signal transmission line for transmitting the RF signal generated by the transmission circuit unit may be connected substantially to the center of an electrode of the EFC antenna via an impedance matching unit and the resonating section. In the receiver, an RF-signal transmission line for transmitting the RF signal to the reception circuit unit may be connected substantially to the center of an electrode of the EFC antenna via an impedance matching unit and the resonating section. The impedance matching units make the impedance of the EFC antenna of the transmitter equal to the impedance of the EFC antenna of the receiver, thereby suppressing reflected waves between the EFC antennas and reducing the propagation loss.

Each impedance matching unit and each resonating section are configured to achieve impedance matching between the electrodes of the transmitter and the receiver, that is, in a coupling portion, and to suppress reflected waves. The impedance matching unit and the resonating section may serve as a band-pass filter with a desired RF band as a passband between the EFC antennas of the transmitter and the receiver.

The impedance matching unit and the resonating section may include, for example, a lumped-constant circuit including a series inductor and a parallel inductor, which are connected to the RF-signal transmission line. However, since constants such as inductance L and capacitance C are determined on the basis of the center frequency of the lumped-constant circuit, impedance matching is not achieved in a frequency band deviated from an assumed center frequency, and the lumped-constant circuit does not operate as designed. In other words, the lumped-constant circuit operates only effectively over a narrow band. Particularly in a higher-frequency band, the resonating frequency is changed depending on the detailed structure of the lumped-constant circuit portion and variations in the inductors and capacitor having small values, and hence the frequency adjustment is difficult. In the case where the impedance matching unit and the resonating section include a lumped-constant circuit, if a small chip inductor is used as an inductor, loss is incurred in the chip inductor, and hence the propagation loss between the EFC antennas is increased.

In the case where each EFC antenna is accommodated in a casing of a device, it is expected that the central frequency of the EFC antenna will change due to the influence of a surrounding metal component. It is therefore necessary to design the EFC antenna in advance to operate effectively over wide frequencies. In the case where a plurality of devices operating over narrow bands is disposed, the overall system operates over a narrower band. It thus becomes difficult to use a plurality of EFC antennas at the same time in a wideband communication system.

In the case where a frequency spread scheme such as DSSS is used in a very-short-distance communication system for transmitting a UWB communication signal using an electrostatic magnetic field, it is necessary to widen the frequency band of each EFC antenna.

In the communication system according to the embodiment of the present invention, each of the EFC antennas for performing short-distance communication using electrostatic coupling includes a coupling electrode and an impedance matching unit and a resonating section configured to achieve impedance matching between the coupling electrodes, the impedance matching unit and the resonating section including a distributed-constant circuit instead of a lumped-constant circuit, thereby widening the frequency band.

As in a circuit module constituting the communication circuit unit configured to process the RF signal for transmitting data, the EFC antenna may be mounted as one surface-mounted component on a printed circuit board.

In this case, the distributed-constant circuit may be configured as a stub including a conductive pattern disposed on the printed circuit board. Ground may be formed on another surface of the printed circuit board, a tip portion of the stub being connected to the ground via a through hole provided in the printed circuit board.

The stub may have a length approximately one-half the wavelength of an operating frequency, and the coupling electrode may be disposed substantially at the center of the stub, at which the amplitude of a standing wave becomes maximum.

The coupling electrode may include a conductive pattern evaporated on a surface of an insulating spacer. The spacer is a circuit component which is surface-mounted on the printed circuit board. In the case where the spacer is mounted on the printed circuit board, the conductive pattern of the coupling electrode may be connected substantially to the center of the stub via a through hole in the spacer. By using an insulator which has a high dielectric constant as the spacer, the length of the stub can be made shorter than one-half the wavelength due to the wavelength shortening effect.

As has been described above, the stub has a length one-half the wavelength of the operating frequency. By shaping the stub to have a folding shape, the stub can be accommodated in an area occupied by the spacer mounted on the printed circuit board.

Alternatively, the stub may include a conductive pattern evaporated on another surface of the spacer.

In a communication scheme using electrostatic coupling, in order to generate electric-field coupling between coupling electrodes of a transmitter and a receiver, fine alignment of the coupling electrodes is necessary. During data communication, the positions of the coupling electrodes are necessary to be maintained. In order to solve this type of problem, a plurality of EFC antennas may be arranged in an array in at least one of the transmitter and the receiver. Since each of the EFC antennas according to the embodiment of the present invention operates over a wideband, even in the case where the EFC antennas are arranged in an array and used at the same time in the wideband communication system, the communication system can remain operating effectively over a wideband.

In such a case, the EFC antennas can be designed such that an EFC antenna that is not coupled to an EFC antenna of a communication partner may be regarded substantially as an open end. Thus, some of RF signals may be reflected from the open end back to a coupled EFC antenna, and RF signals may be output from the communication circuit unit only to an EFC antenna coupled to the EFC antenna of the communication partner. In this case, in order to avoid interference between the original signals and signals reflected from the open end, the length of a signal line connecting between the EFC antennas is preferably an integral multiple of one-half the wavelength, or the difference between the lengths of the signal lines connecting between the transmission/reception circuit module and the corresponding EFC antennas is preferably an integral multiple of one-half the wavelength.

According to the embodiments of the present invention, there is provided an excellent communication system and communication apparatus that can perform high-capacity data communication between information devices using a UWB communication scheme employing an RF wideband signal.

According to the embodiments of the present invention, there is provided an excellent communication system and communication apparatus that can transmit a UWB communication signal between information devices placed at a very short distance by using an electrostatic field or an induced electric field.

According to the embodiments of the present invention, there is provided an excellent communication system and communication apparatus that can perform high-capacity transmission by efficiently transmitting an RF signal between EFC antennas of information devices using an electrostatic field or an induced electric field over a very short distance.

According to the embodiments of the present invention, there is provided an excellent communication system and communication apparatus that can perform high-capacity transmission by forming a noise-resistant electric-field-coupling transmission line which establishes electric-field coupling in an RF band between EFC antennas of a transmitter and a receiver and operates effectively over a wideband.

In the communication apparatus according to the embodiment of the present invention, the impedance matching unit and the resonating section of the EFC antenna can be configured as a pattern on a printed circuit board, namely, a stub, which is a distributed-constant circuit, thereby operating suitably over a wideband.

Since the EFC antennas according to the embodiment of the present invention each operate over a wideband, even in the case where the EFC antennas are arranged in an array and used at the same time, the communication system can remain operating effectively over a wideband.

According to the embodiments of the present invention, the impedance matching unit and the resonating section of the EFC antenna can be configured as a pattern on a printed circuit board, namely, a stub, which is a distributed-constant circuit. Since the direct-current resistance of the conductive pattern on the printed circuit board is small, the loss is small even in the case of an RF signal, and the propagation loss between the EFC antennas can be reduced.

According to the embodiments of the present invention, the size of the stub constituting the distributed-constant circuit is approximately one-half the wavelength of an RF signal, which is relatively large, and size errors within the tolerance at the time of manufacture are negligible compared with the overall length. Hence characteristic variations are less likely to occur. A portion of the pattern or the stub on the printed circuit board longer than the coupling electrode may be folded under the coupling electrode, whereby the EFC antenna can be made more compact than a known EFC antenna.

Further features and advantages of the present invention will become apparent from the following description of exemplary embodiments with reference to the attached drawings.

DESCRIPTION OF THE PREFERRED EMBODIMENTS

Figure 1:
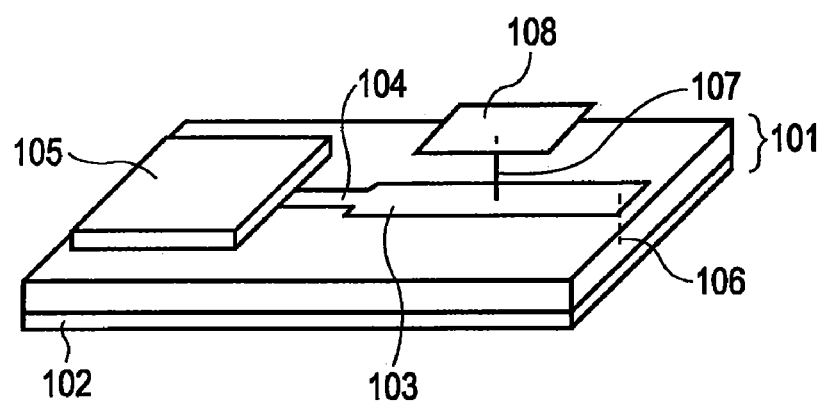
FIG. 1 is a diagram of an exemplary structure of an EFC antenna according to an embodiment of the present invention.

Preferred embodiments of the present invention will now herein be described in detail below with reference to the drawings.

The present invention relates to a communication system for performing data transmission between information devices using an electrostatic field or an induced electric field.

According to a communication scheme based on an electrostatic field or an induced electric field, no radio waves are emitted in the absence of communication partners nearby since no coupling relationship occurs, and hence other communication systems are not disturbed. Even in the case where radio waves arrive from far away, an EFC antenna receives no radio waves, and hence the communication system is not interfered with by other communication systems.

In known radio communication using antennas, the strength of a radiated electric field is inversely proportional to the distance. In contrast, the strength of an induced electric field is attenuated in inverse proportion to the square of the distance, and the strength of an electrostatic field is attenuated in inverse proportion to the cube of the distance. According to a communication scheme based on the electric-field coupling, very weak radio waves merely causing noise for other wireless systems existing in the neighborhood can be emitted, and hence the licensing of a radio station becomes unnecessary.

Although an electrostatic field changing with time may be referred to as a "quasi-electrostatic field", this is also included in an "electrostatic field" in this specification.

Since known communication employing an electrostatic field or an induced electric field uses lower-frequency signals, the known communication is unsuitable for transferring a large amount of data. In contrast, a communication system according to an embodiment of the present invention transfers higher-frequency signals using the electric-field coupling, and hence the communication system can transfer a large amount of data. More specifically, as in ultra-wideband (UWB) communication, a communication scheme using high frequencies over a wideband is applied to the electric-field coupling, thereby implementing high-capacity data communication using very weak radio waves.

The UWB communication uses a very wide frequency band from 3.1 GHz to 10.6 GHz and implements, though over a short distance, wireless transmission of a large amount of data at a rate of approximately 100 Mbps. The UWB communication is a communication technology originally developed as a radio communication scheme using antennas. For example, in IEEE 802.15.3 or the like, the scheme of transmitting data having a packet structure including a preamble is designed as an access control scheme in the UWB communication. Intel Corporation in the United States is studying, as a UWB application, a wireless version of USB, which has been widely used as a general interface for PCs.

UWB transmission systems using a UWB low-band from 3.1 GHz to 4.9 GHz have been actively developed taking into consideration that the UWB communication can transfer data at a rate exceeding 100 Mbps without occupying a transmission band from 3.1 GHz to 10.6 GHz, and the simplicity of fabricating an RF circuit. The inventor of the present invention believes that a data transmission system employing a UWB low-band is one of effective wireless communication techniques to be applied to mobile devices. For example, high-speed data transmission in a short-distance area, such as an ultra-high-speed, short-distance device area network (DAN) including a storage device, can be implemented.

The inventor of the present invention believes that, according to a UWB communication system employing an electrostatic field or an induced electric field, data communication using a very weak electric field can be implemented. The inventor also believes that, according to such a UWB communication system, a large amount of data, such as a moving image or music data contained in one CD, can be transferred at high speed in a short period of time.

Figure 14:
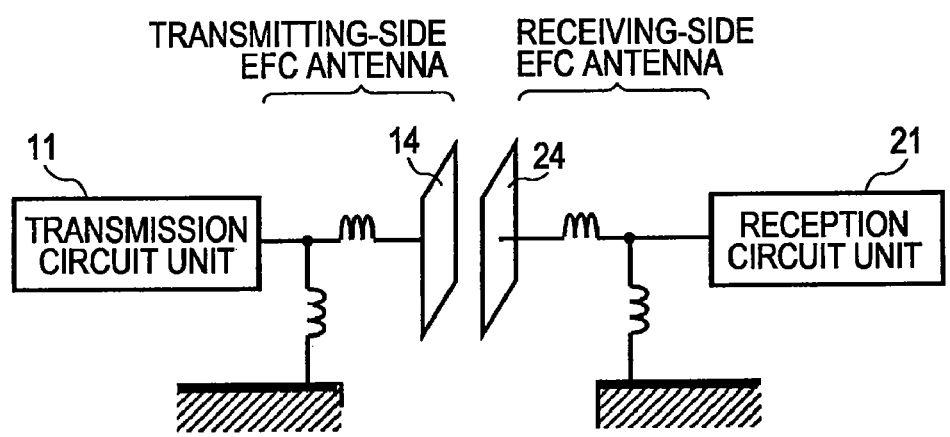
FIG. 14 is a diagram of an exemplary configuration of a communication system including a transmitter and a receiver each having the EFC antenna shown in FIG. 13.

FIG. 14 shows an exemplary configuration of a contactless communication system using an electrostatic field or an induced electric field. The communication system illustrated in the drawing includes a transmitter 10 configured to perform data transmission and a receiver 20 configured to perform data reception. As illustrated in FIG. 14, in the case where EFC antennas of the transmitter and the receiver are disposed facing each other, two electrodes operate as a capacitor, and the EFC antennas as a whole operate as a band-pass filter, thereby efficiently transmitting an RF signal between the two EFC antennas. In the communication system illustrated, a transmission line using electric-field coupling can be suitably formed in the case where sufficient impedance matching is achieved between the EFC antennas of the transmitter and the receiver, and the EFC antennas efficiently operate at high frequencies over a wideband.

A transmission electrode 14 of the transmitter 10 and a reception electrode 24 of the receiver 20 are arranged facing each other with a gap of, for example, 3 cm, and hence can produce electric-field coupling. In response to a transmission request issued from an upper application, a transmission circuit unit 11 of the transmitter 10 generates an RF transmission signal, such as a UWB signal, on the basis of transmission data, and the signal propagates from the transmission electrode 14 to the reception electrode 24. A reception circuit unit 21 of the receiver 20 demodulates and decodes the RF signal received to reproduce data and transfers the reproduced data to the upper application.

According to a communication scheme using high frequencies over a wideband as in the UWB communication, ultra-high speed data transmission at a rate of approximately 100 Mbps can be implemented over a short distance. In the case where the UWB communication is performed using electric-field coupling instead of performing radio communication, the strength of the electric field is in inverse proportion to the cube or the square of the distance. By controlling the strength of the electric field (strength of radio waves) over a distance of 3 m from a wireless facility to be less than or equal to a predetermined level, very weak radio waves can be emitted, and hence the licensing of a radio station becomes unnecessary. Therefore, an inexpensive communication system can be implemented. In the case of very-short-distance data communication using an electric-field coupling scheme, the quality of a signal is not deteriorated due to a neighboring reflector. Further, it is also unnecessary to take into consideration prevention of hacking on a transmission line and securing of confidentiality.

In contrast, the propagation loss increases with the propagation distance relative to the wavelength. In order to allow an RF signal to propagate using electric-field coupling, the propagation loss is necessary to be reduced to a sufficiently small value. In the communication scheme of transmitting an RF wideband signal, such as a UWB signal, using electric-field coupling, communication over a very short distance of approximately 3 cm corresponds to approximately one-half of the wavelength of an operating frequency of 4 GHz. Thus, such a very short distance should not be neglected. Particularly, the characteristic impedance causes a more serious problem in a higher-frequency circuit than in a lower-frequency circuit. An impedance mismatch at a coupling point between electrodes of a transmitter and a receiver has a more striking effect in a higher-frequency circuit.

Figure 17:
FIG. 17 illustrates an exemplary structure in which, in communication using frequencies of kHz or MHz, a transmitter and a receiver each have an EFC antenna including only an electrode, and a coupling portion simply operates as a plane parallel capacitor.
Figure 18:
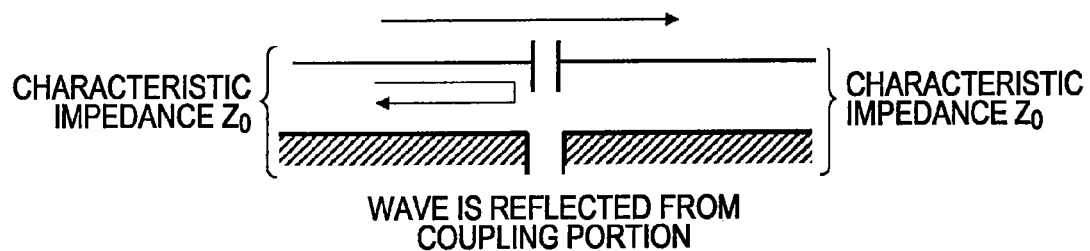
FIG. 18 illustrates a propagation loss caused by signal reflection from an impedance mismatch portion in a coupling portion in the case of communication using higher frequencies of GHz.

Since the propagation loss in space is small in the case of communication using frequencies of kHz or MHz, as illustrated in FIG. 17, desired data transmission can be performed even in the case where a transmitter and a receiver each have an EFC antenna including only an electrode and a coupling portion simply operates as a plane parallel capacitor. In contrast, communication using higher frequencies of GHz has a large propagation loss in space. It is thus necessary, to suppress signal reflection and to improve transmission efficiency. As illustrated in FIG. 18, in the case where an RF-signal transmission line of a transmitter and an RF-signal transmission line of a receiver are adjusted to a predetermined characteristic impedance $Z_0$, no impedance matching can be achieved in a coupling portion by simply coupling the two transmission lines using a plane parallel capacitor. Therefore, a signal is reflected from an impedance mismatch portion in the coupling portion, thereby causing a propagation loss and reducing the efficiency.

For example, even in the case where an RF-signal transmission line connecting the transmission circuit unit 11 to the transmission electrode 14 is a coaxial line with a matched impedance of 50Ω), in the case of an impedance mismatch in a coupling portion between the transmission electrode 14 and the reception electrode 24, a signal is reflected to incur propagation loss.

Figure 13:
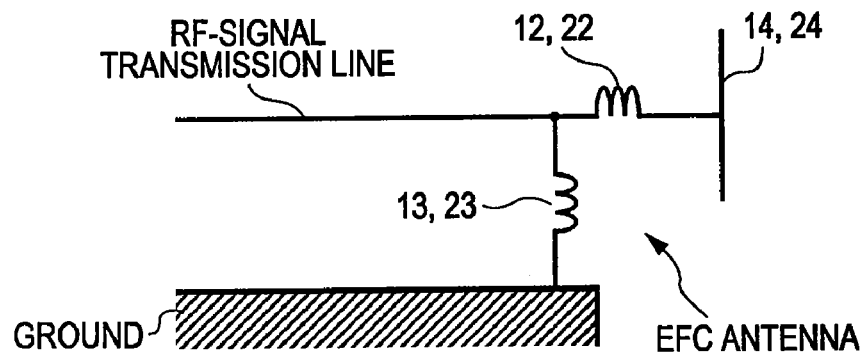
FIG. 13 is an equivalent circuit diagram of an EFC antenna in which an impedance matching unit and a resonating section include a lumped-constant circuit.
Figure 19:
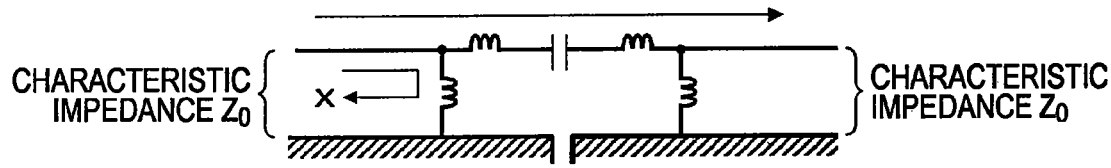
FIG. 19 is a diagram of the structure in which electrodes of the EFC antennas illustrated in FIG. 13 are disposed facing each other.

EFC antennas provided in the transmitter 10 and in the receiver 20 include, as illustrated in FIG. 13, the electrodes 14 and 24 in a plate shape, series inductors 12 and 22, and parallel inductors 13 and 23, which are connected to the RF-signal transmission line. In the case where the above-mentioned EFC antennas are arranged facing each other, as illustrated in FIG. 19, the two electrodes operate as a capacitor, and the EFC antennas as a whole operate as a band-pass filter. Therefore, an RF signal can be transmitted efficiently between the two EFC antennas. The RF-signal transmission line mentioned here corresponds to a coaxial cable, a microstrip line, a coplanar line, or the like.

Figure 20A:
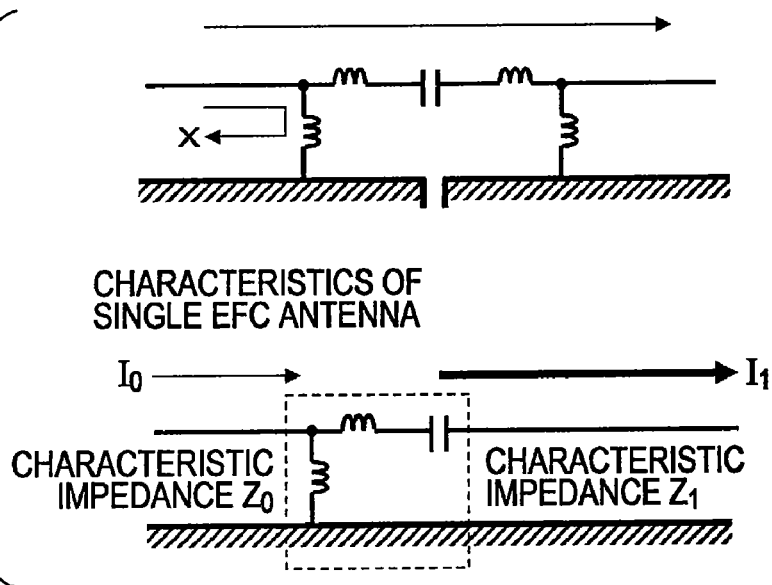
FIG. 20A illustrates characteristics of the single EFC antenna illustrated in FIG. 13.
Figure 20B:
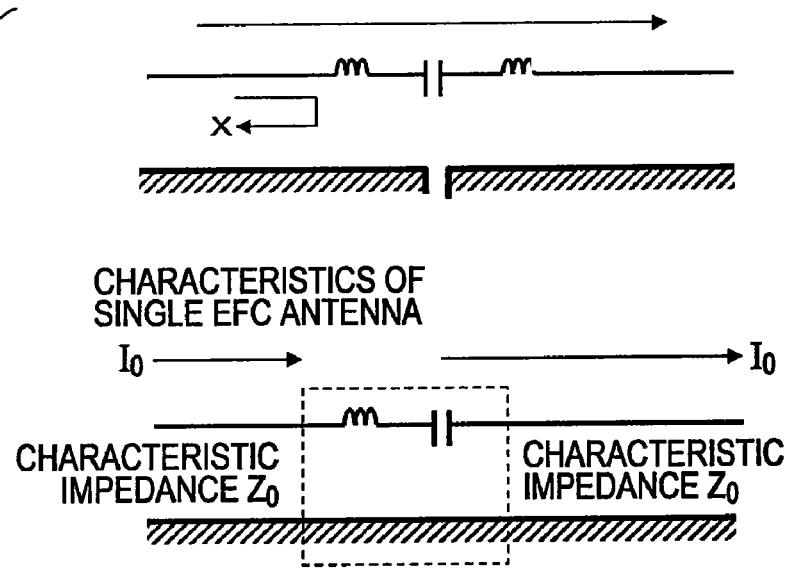
FIG. 20B illustrates characteristics of the single EFC antenna illustrated in FIG. 13.

If it is only necessary to achieve impedance matching and to suppress reflected waves between the electrodes of the transmitter 10 and the receiver 20, that is, in the coupling portion, it is not necessary for, as illustrated in FIG. 20A, the EFC antennas to include the plate-shaped electrodes 14 and 24, the series inductors 12 and 22, and the parallel inductors 13 and 23, which are connected to the RF-signal transmission line. Rather, as illustrated in FIG. 20B, it is sufficient for the EFC antennas to have a simple structure in which the plate-shaped electrodes 14 and 24 and the series inductors are connected to the RF-signal transmission line. That is, by simply disposing the series inductors on the RF-signal transmission line in the case where the EFC antenna of the transmitter faces the EFC antenna of the receiver at a very short distance, the impedance in the coupling portion can be designed to be continuous.

Note that, in an exemplary structure illustrated in FIG. 20B, there is no change in the characteristic impedance before and after the coupling portion, and hence the amount of current does not change either. In contrast, as illustrated in FIG. 20A, in the case where the EFC antenna is connected to ground via the parallel inductance interposed between the input side of the electrode at the tip of the RF-signal transmission line and ground, the EFC antenna alone functions as an impedance conversion circuit configured to reduce the characteristic impedance $Z_1$ at the output side of the EFC antenna relative to the characteristic impedance $Z_0$ at the input side of the EFC antenna (that is, $Z_0 > Z_1$). Therefore, the output current of the EFC antenna can be amplified compared with the input current $I_0$ input to the EFC antenna (that is, $I_0 < I_1$).

Figure 21A:
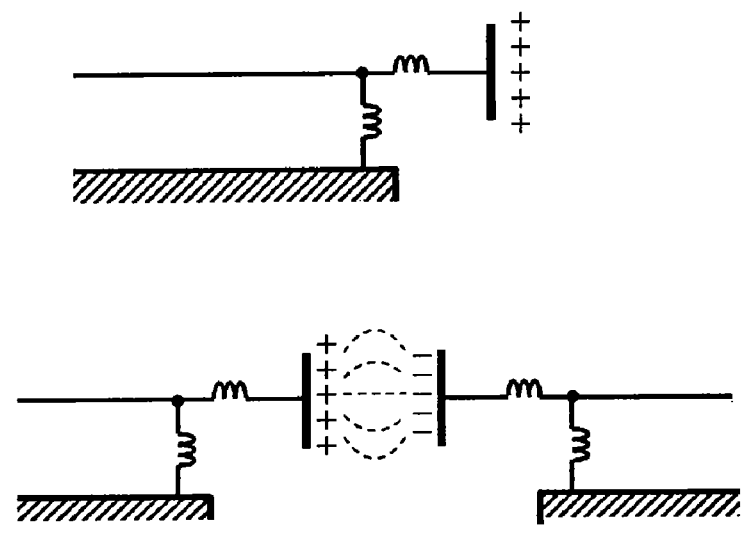
FIG. 21A illustrates the induction of an electric field by the EFC antenna with the function as an impedance converter.
Figure 21B:
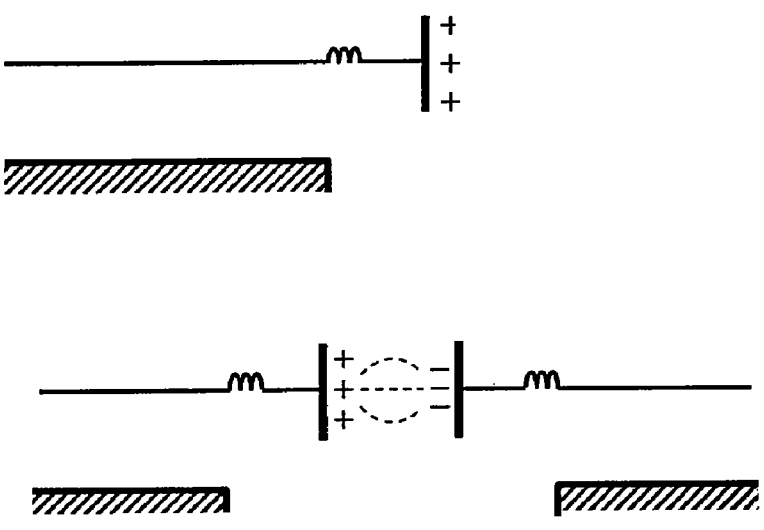
FIG. 21B illustrates the induction of an electric field by the EFC antenna with the function as an impedance converter.

FIGS. 21A and 21B illustrate the induction of an electric field by the electric-field coupling between the electrodes of the EFC antennas with and without parallel inductances. As is clear from the drawings, a stronger electric field can be induced by providing parallel inductors in addition to series inductors in the EFC antennas, thereby allowing the electrodes to be strongly coupled to each other. In the case where a strong electric field is induced near the electrodes as illustrated in FIG. 21A, the generated electric field propagates in the front direction of the electrode surface as a longitudinal wave causing vibration along the direction of travel. Due to this electric-field wave, a signal can be transmitted between the electrodes even when the electrodes are separated at a relatively large distance.

In a communication system for transmitting an RF signal, such as a UWB signal, using electric-field coupling, the necessary conditions of the EFC antennas are as follows:
(1) the presence of electrodes for establishing electric-field coupling;
(2) the presence of parallel inductors for establishing stronger electric-field coupling; and
(3) the setting of the constants of the inductors and the constant of a capacitor including the electrodes such that the impedance matching can be achieved in a frequency band used for communication in the case where the EFC antennas are placed facing each other.

Figure 15:
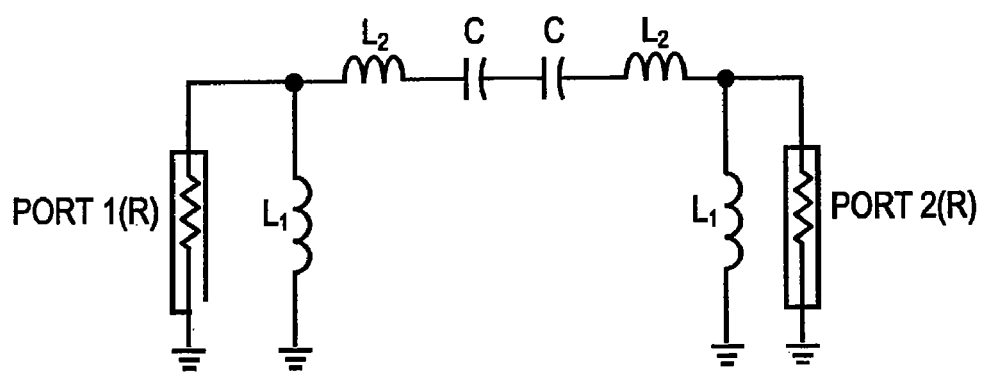
FIG. 15 is an equivalent circuit diagram of a band-pass filter including two EFC antennas shown in FIG. 13, which are disposed facing each other.

The passband frequency $f_0$ of a band-pass filter including a pair of EFC antennas having electrodes facing each other, as illustrated in FIG. 19, can be determined on the basis of the inductances of the series inductors and the parallel inductors and the capacitance of the capacitor including the electrodes. FIG. 15 is an equivalent circuit diagram of a band-pass filter including a pair of EFC antennas. Given the characteristic impedance R [a], the center frequency $f_0$ [Hz], and the phase difference $\alpha$ [radian] ($\pi<\alpha<2\pi$) between an input signal and a pass signal, and the capacitance C/2 of the capacitor including the electrodes, the constants $L_1$ and of $L_2$ of the parallel inductance and the series inductance included in the band-pass filter can be calculated in accordance with the operating frequency $f_0$ using the following equations:

$$L_1 = -\frac{R(1 + \cos\alpha)}{2\pi f_0 \sin\alpha}[H] \quad (1)$$

$$L_2 = \frac{1 + \pi f_0 CR\sin\alpha}{4\pi^2 f_0^2 C}[H]$$

Figure 22:
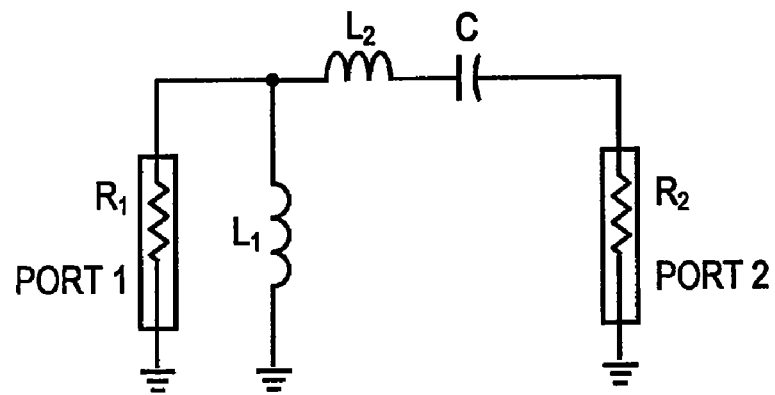
FIG. 22 is an equivalent circuit diagram of an impedance conversion circuit including a single EFC antenna.

In the case where a single EFC antenna functions as an impedance conversion circuit, an equivalent circuit thereof is illustrated in FIG. 22. In the circuit diagram illustrated in FIG. 22, the parallel inductance $L_1$ and the series inductance $L_2$ are selected in accordance with the operating frequency $f_o$ so as to satisfy the following equations and expression, thereby implementing an impedance conversion circuit configured to convert the characteristic impedance from $R_1$ to $R_2$:

$$L_1 = \frac{R_1}{2\pi f_0}\sqrt{\frac{R_2}{R_1 - R_2}}[H] \quad (2)$$

$$L_2 = \frac{1}{4\pi^2 f_0^2}\left(\frac{1}{C} - 2\pi f_0 \sqrt{R_2(R_1 - R_2)}\right)[H]$$

$$R_1 > R_2$$

As has been described above, in the contactless communication system illustrated in FIG. 14, communication devices that perform the UWB communication use the EFC antennas illustrated in FIG. 13 instead of antennas used in wireless communication devices employing a known radio communication scheme. Therefore, very-short-distance data transmission with features that have not been achieved before can be implemented.

As illustrated in FIG. 19, two EFC antennas whose electrodes face each other at a very short distance operate as a band-pass filter for allowing passage of signals in a desired frequency band, and a single EFC antenna operates as an impedance conversion circuit configured to amplify current. In contrast, in the case where the single EFC antenna is placed in free space, the input impedance of the EFC antenna does not match the characteristic impedance of the RF-signal transmission line. As a result, a signal input from the RF-signal transmission line is reflected in the EFC antenna and is not emitted to the outside.

According to the contactless communication system illustrated in FIG. 14, unlike an antenna, the transmitter does not continuously emit radio waves in the absence of a communication partner. Only when a communication partner approaches the transmitter and an electrode of the communication partner and the electrode of the transmitter form a capacitor, impedance matching is achieved, as illustrated in FIG. 19, whereby an RF signal is transmitted.

Figure 23:
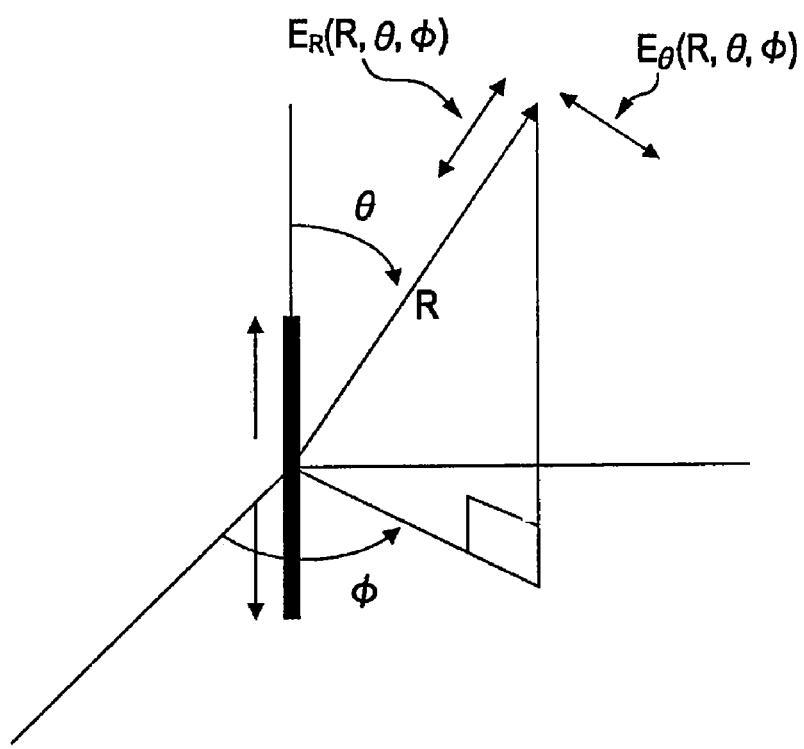
FIG. 23 illustrates an electric field component (longitudinal wave component) $E_R$ causing vibration parallel to the direction of propagation.
Figure 24:
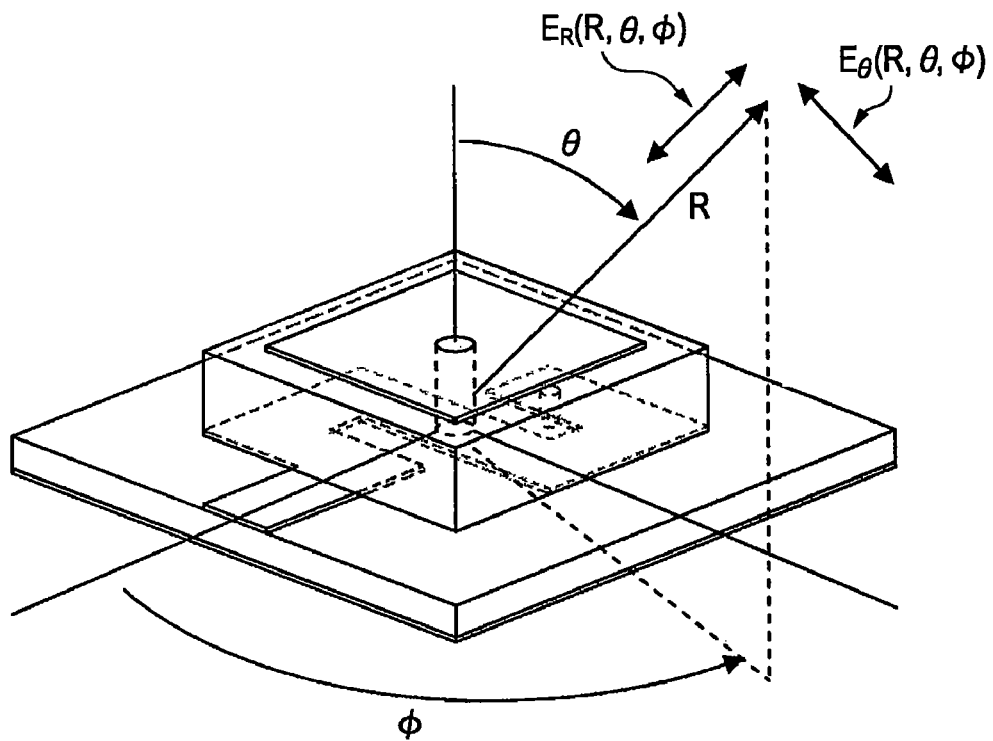
FIG. 24 illustrates the mapping of an electromagnetic field induced by an infinitesimal dipole on a coupling electrode.

An electromagnetic field generated by a coupling electrode of a transmitter will be examined. FIG. 23 illustrates an electromagnetic field induced by an infinitesimal dipole. FIG. 24 illustrates the mapping of this electromagnetic field on the coupling electrode. As shown in the diagrams, the electromagnetic field is largely classified into an electric field component (transverse wave component) $E_\theta$ causing vibration in a direction perpendicular to the direction of propagation and an electric field component (longitudinal wave component) $E_R$ causing vibration parallel to the direction of propagation. A magnetic field $H_\phi$ is also generated around the infinitesimal dipole. The following equations represent an electromagnetic field induced by an infinitesimal dipole. Any current distribution can be regarded as a continuous assembly of such infinitesimal dipoles. Therefore, electromagnetic fields induced by these infinitesimal dipoles have similar characteristics (for example, see Yasuto Mushiake, "Antenna Denpa Denpan (Antenna/Radio-Wave Propagation)", published by Corona Publishing Co., Ltd., 1985, pp. 16-18).

$$E_\theta = \frac{pe^{-jkR}}{4\pi\varepsilon}\left(\frac{1}{R^3} + \frac{jk}{R^2} - \frac{k^2}{R}\right)\sin\theta \quad (3)$$

$$E_R = \frac{pe^{-jkR}}{2\pi\varepsilon}\left(\frac{1}{R^3} + \frac{jk}{R^2}\right)\cos\theta$$

$$H_\phi = \frac{j\omega pe^{-jkR}}{4\pi}\left(\frac{1}{R^2} + \frac{jk}{R}\right)\sin\theta$$

As is clear from the above equations, the electric-field transverse wave component includes a component in inverse proportion to the distance (radiated electric field), a component in inverse proportion to the square of the distance (induced electric field), and a component in inverse proportion to the cube of the distance (electrostatic field). The electric-field longitudinal wave component includes a component in inverse proportion to the square of the distance (induced electric field) and a component in inverse proportion to the cube of the distance (electrostatic field), but does not include a component of the radiated electromagnetic field. The electric field $E_R$ reaches its maximum in directions where $|\cos\theta|=1$, that is, in directions indicated by arrows in FIG. 23.

In radio communication widely employed in wireless communication, a radio wave emitted from an antenna is a transverse wave $E_\theta$ causing vibration in a direction perpendicular to its direction of travel. A radio wave perpendicular to the direction of polarization is not communicated. In contrast, an electromagnetic wave emanating from a coupling electrode by employing a communication scheme using an electrostatic field or an induced electric field includes, besides a transverse wave $E_\theta$, a longitudinal wave $E_R$ causing vibration along its direction of travel. The longitudinal wave $E_R$ is also referred to as a "surface wave". By the way, a surface wave can also propagate through the interior of a medium, such as a conductor, a dielectric, or a magnetic body.

Of transmission waves using electromagnetic fields, a wave whose phase velocity v is slower than the velocity of light c is referred to as a "slow wave", and a wave whose phase velocity v is faster than the velocity of light c is referred to as a "fast wave". A surface wave corresponds to the former slow wave.

In a contactless communication system, a signal can be transmitted through the intermediary of any of a radiated electric field, an electrostatic field, and an induced electric field. However, a radiated electric field, which is inversely proportional to the distance, may interfere with other systems located relatively far away. It is thus preferable to suppress the radiated electric field component, that is, to perform contactless communication using the longitudinal wave $E_R$ containing no radiated electric field component while suppressing the transverse wave $E_\theta$ containing the radiated electric field component.

Figure 16A:
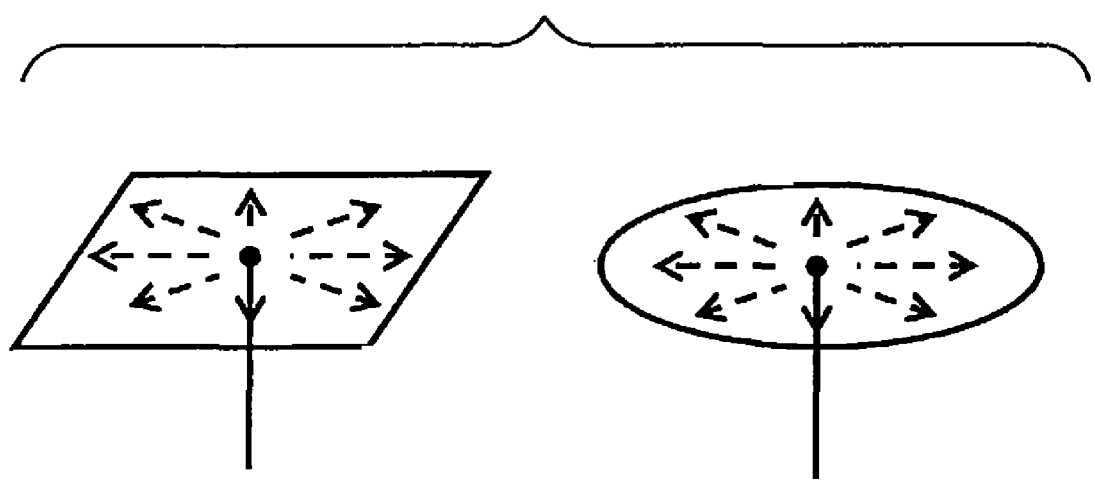
FIG. 16A illustrates the case where an RF transmission line is connected to the center of a coupling electrode.

From the above-mentioned viewpoint, the EFC antennas according to the embodiment are devised in the following manner. That is, the above-mentioned three equations representing the electromagnetic field show that, in the case where $\theta=0°$ holds true, $E_\theta=0$ holds true, and the $E_R$ component reaches its maximum. More specifically, $E_\theta$ reaches its maximum when it is perpendicular to the direction of current flow, and $E_R$ reaches its maximum when it is parallel to the direction of current flow. In order to maximize $E_R$ in front of the electrode, which is perpendicular to the electrode surface, it is preferable to increase current components perpendicular to the electrode. In contrast, in the case where the feeding point is offset from the center of the electrode, current components parallel to the electrode increase due to this offset. In accordance with the current components, the $E_\theta$ component in front of the electrode increases. Therefore, each of the EFC antennas according to the embodiment provides the feeding point substantially at the center of the electrode (described later), as illustrated in FIG. 16A, such that the $E_R$ component can be maximized.

In known antennas, besides a radiated electric field, an electrostatic field and an induced electric field are also generated. The electric-field coupling occurs in the case where a transmission antenna and a reception antenna are placed near each other. However, since most of the energy is emitted as a radiated electric field, such known antennas are insufficient to perform contactless communication. In contrast, the EFC antennas illustrated in FIG. 13 include the coupling electrodes and resonating sections in order to improve the transmission efficiency by generating a stronger electric field $E_R$ at a predetermined frequency.

In the case where the EFC antenna of the transmitter illustrated in FIG. 13 is used alone, a longitudinal-wave electric field component $E_R$ is generated on the surface of the coupling electrode. Since a transverse-wave component $E_\theta$ containing a radiated electric field is smaller than $E_R$, only negligible radio waves are emitted. That is, waves interfering with other neighboring systems are not generated. Most of the signals input to the EFC antenna are reflected from the electrode back to an input end.

In contrast, in the case where a pair of EFC antennas is used, that is, in the case where EFC antennas of a transmitter and a receiver are placed at a short distance, coupling electrodes are coupled to each other mainly by a quasi-electrostatic field component and operate as a capacitor. As a result, the EFC antennas as a whole operate as a band-pass filter, thus achieving impedance matching. At passband frequencies, signals and power are largely transmitted to a communication partner and are negligibly reflected back to the input end. The "short distance" mentioned here is defined by wavelength λ, that is, corresponds to the distance between the coupling electrodes d being $d \ll \lambda/2\pi$. For example, in the case where the operating frequency $f_0$ is 4 GHz, the "short distance" between the electrodes is a distance of 10 mm or less.

In the case where the EFC antennas of the transmitter and the receiver are placed at a medium distance, an electrostatic field is attenuated and a longitudinal-wave electric field $E_R$ mainly containing an induced electric field is generated in the vicinity of the coupling electrode of the transmitter. The longitudinal-wave electric field $E_R$ is received by the coupling electrode of the receiver, whereby a signal is transmitted. Note that, compared with the case where the EFC antennas are placed at a short distance, it is more likely that a signal input to the EFC antenna of the transmitter will be reflected from the electrode back to the input end. The "medium distance" mentioned here is defined by the wavelength λ, that is, corresponds to the distance between the coupling electrodes d being approximately one to a few times $\lambda/2\pi$. In the case where the operating frequency $f_0$ is 4 GHz, the "medium distance" between the electrodes is a distance from 10 mm to 40 mm.

As has been described above, in each of the EFC antennas illustrated in FIG. 13, the operating frequency $f_o$ of an impedance matching unit is determined by constants $L_1$ and $L_2$ of the parallel inductor and the series inductor. In a general circuit producing method, the series inductors 12 and 22 and the parallel inductors 13 and 23 are configured using circuit elements contained in a lumped-constant circuit. In contrast, it is known that, in the case of RF circuits, a lumped-constant circuit operates over a narrower band than a distributed-constant circuit. The higher the frequency, the lower the constant of the inductor. Thus, the resonating frequency is deviated due to variations in the constants.

According to the embodiment of the present invention, in each EFC antenna, the impedance matching unit and the resonating section include a distributed-constant circuit instead of a lumped-constant circuit, thereby allowing the EFC antenna to operate over a wider band.

FIG. 1 is a diagram of an exemplary structure of an EFC antenna according to the embodiment of the present invention.

In the illustrated example, an EFC antenna is disposed on a printed circuit board 101. A ground conductor 102 is placed on the lower surface of the printed circuit board 101, and a printed pattern is placed on the upper surface of the printed circuit board 101. As an impedance matching unit and a resonating section of the EFC antenna, a conductive pattern or a stub 103 serving as a distributed-constant circuit is provided instead of a parallel inductor and a series inductor, and the stub 103 is connected to a transmission/reception circuit module 105 via a signal line pattern 104. A tip of the stub 103 is short-circuited by being connected to the ground 102 on the lower surface via a through hole 106 penetrating through the printed circuit board 101. A central portion of the stub 103 is connected to a coupling electrode 108 via a metal line 107.

The "stub" used in the technical field of electronics is a general term for wires whose one end is connected and the other end is not connected or connected to ground. A stub is included in a circuit for performing adjustment, measurement, impedance matching, filtering, or the like.

Figure 2:
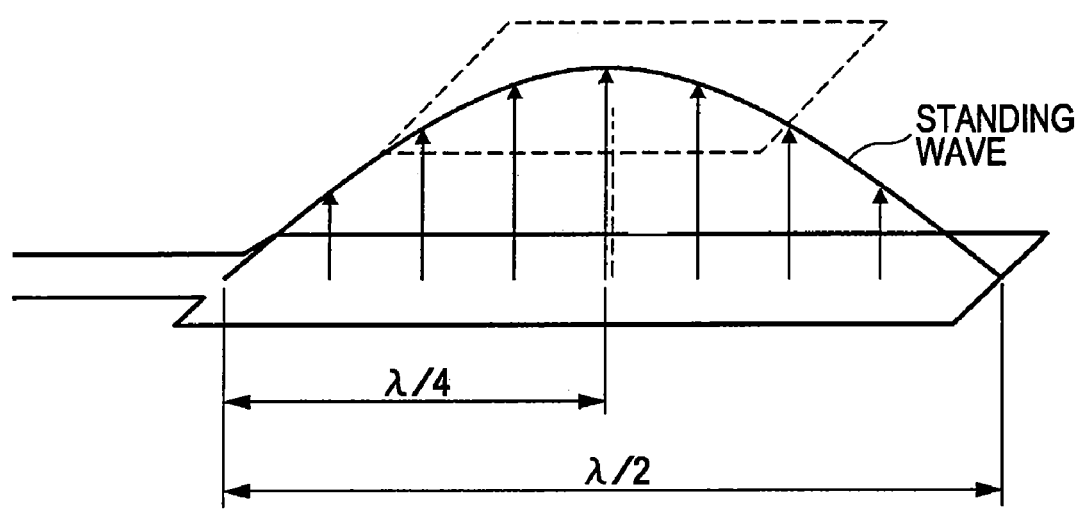
FIG. 2 is a diagram of the generation of a standing wave on a stub 103.

The length of the stub 103 is approximately one-half the wavelength of an RF signal. The signal line 104 and the stub 103 are formed of a microstrip line or a coplanar line on the printed circuit board 101. In the case where the length of the stub 103 is one-half the wavelength and is short-circuited at its tip, the amplitude of the voltage of a standing wave generated in the stub 103 becomes zero at the tip of the stub 103, and becomes maximum at the center of the stub 103, that is, at one-fourth the wavelength from the tip of the stub 103 (see FIG. 2). By connecting the coupling electrode 108 to the center of the stub 103 where the amplitude of the voltage is maximum using the metal line 107, an EFC antenna with satisfactory transmission efficiency can be fabricated.

By forming the impedance matching unit using a distributed-constant circuit including the stub 103, which is a conductive pattern on the printed circuit board 101, uniform characteristics can be achieved over a wideband. Therefore, a modulation scheme of spreading the frequency of a signal to a wideband signal as in DSSS or OFDM can be used. The stub 103 is a conductive pattern on the printed circuit board 101. Since the stub 103 has a small direct-current resistance, the loss is small even in the case of an RF signal, and the propagation loss between the EFC antennas can be reduced.

Since the size of the stub 103 constituting the distributed-constant circuit is approximately one-half the wavelength of an RF signal, which is large, size errors within the tolerance at the time of manufacture are negligible compared with the overall length, and hence characteristic variations are less likely to occur.

Figure 6:
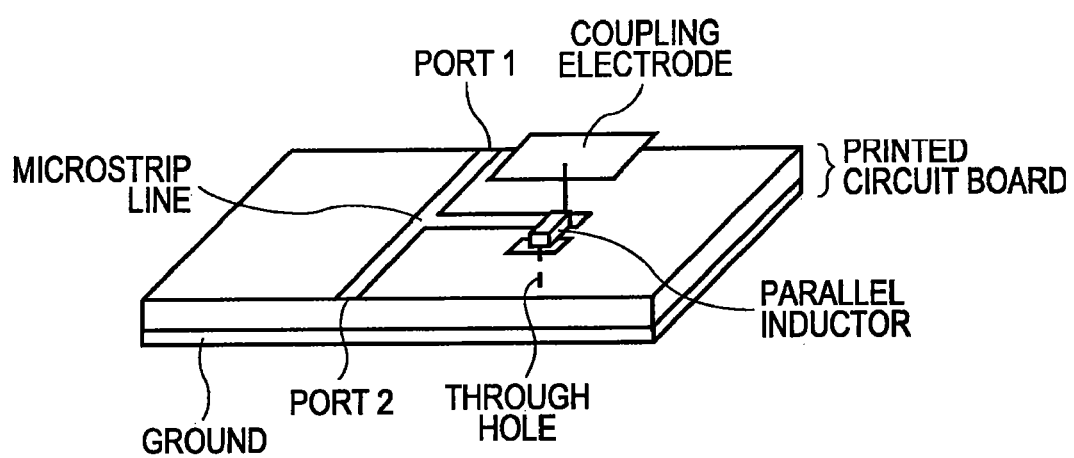
FIG. 6 is a diagram of an EFC antenna in which an impedance matching unit includes a lumped-constant circuit.
Figure 7:
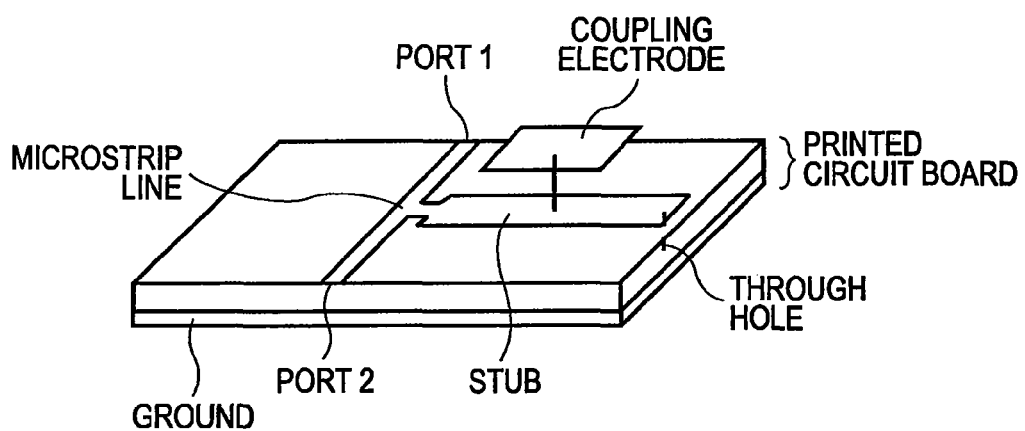
FIG. 7 is a diagram of an EFC antenna in which an impedance matching unit includes a distributed-constant circuit.
Figure 8:
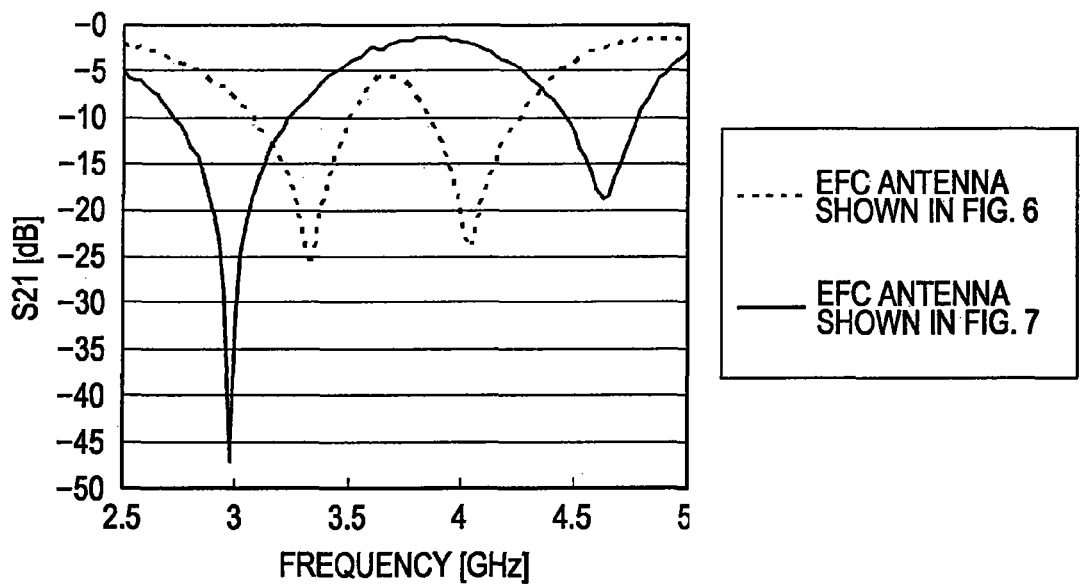
FIG. 8 is a graph showing comparison between the frequency characteristics of the EFC antenna in the case where the impedance matching unit includes a lumped-constant circuit and those in the case where the impedance matching unit includes a distributed-constant circuit.

FIG. 8 is a graph showing comparison between the frequency characteristics of the EFC antenna in the case where the impedance matching unit includes a lumped-constant circuit and those in the case where the impedance matching unit includes a distributed-constant circuit. The EFC antenna in which the impedance matching unit includes a lumped-constant circuit assumes the following, as illustrated in FIG. 6: a coupling electrode is connected to the tip of a signal line pattern on a printed circuit board via a metal line; a parallel inductor is mounted at the tip of the signal line pattern; and another end of the parallel inductor is connected to a ground conductor via a through hole in the printed circuit board. The EFC antenna in which the impedance matching unit includes a distributed-constant circuit assumes the following, as illustrated in FIG. 7: a coupling electrode is connected via a metal line to the center of a stub which is formed on a printed circuit board and whose length is one-half the wavelength; and the tip of the stub is connected to a ground conductor via a through hole in the printed circuit board. Both of the EFC antennas are adjusted so that the operating frequencies are near 3.8 GHz. In FIGS. 6 and 7, an RF signal is transmitted from port 1 to port 2 along a microstrip line, and an EFC antenna is disposed midway of the microstrip line. Frequency characteristics are measured as the characteristics of transmission from port 1 to port 2, and the results are illustrated in FIG. 8.

An EFC antenna that is not coupled to another EFC antenna can be regarded as an open end. Thus, an RF signal input from port 1 is not supplied to the EFC antenna and is transmitted to port 2. In either EFC antenna, a propagation loss $S_{21}$ indicating the strength of a signal transmitted from port 1 to port 2 is large near 3.8 GHz, which is the operating frequency of the EFC antennas. However, in the case of the EFC antenna illustrated in FIG. 6, the value of $S_{21}$ is greatly dropped at frequencies lower and higher than the operating frequency. In contrast, in the case of the EFC antenna illustrated in FIG. 7, the value of $S_{21}$ is large over a wide frequency range around the operating frequency, that is, satisfactory characteristics are maintained. In other words, the EFC antenna operates effectively over a wideband by forming the impedance matching unit using a distributed-constant circuit.

Figure 16B:
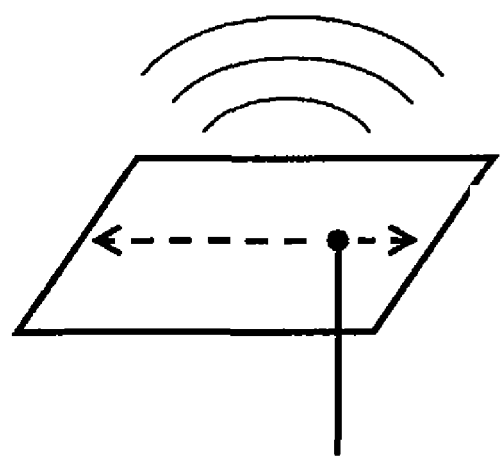
FIG. 16B illustrates the uneven flow of current in a coupling electrode in the case where an RF transmission line is connected to a position offset from the center of the coupling electrode.

The coupling electrode 108 is connected to substantially the center of the stub 103 via the metal line 107. This metal line is preferably connected to the center of the coupling electrode 108. By connecting the RF transmission line to the center of the coupling electrode, current flows evenly in the electrode, thereby preventing unnecessary radio waves from emanating in front of the electrode in a substantially perpendicular direction relative to the electrode surface (see FIG. 16A). In contrast, by connecting the RF transmission line to a position offset from the center of the coupling electrode, current flows unevenly in the coupling electrode, and the electrode operates as a microstrip antenna and emits unnecessary radio waves (see FIG. 16B).

Figure 36:
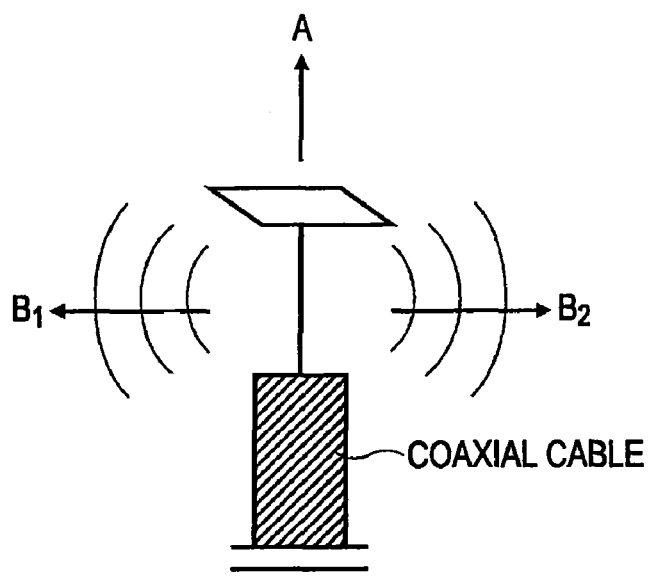
FIG. 36 schematically illustrates the structure of a "capacitance-loaded" antenna in which metal is attached to the tip of an antenna element, thereby inducing a capacitance and reducing the height of the antenna.

In the field of radio communication, "capacitance-loaded" antennas in which metal is attached to the tip of an antenna element, as illustrated in FIG. 36, thereby inducing a capacitance and reducing the height of the antenna, are widely known. At a glance, this type of antenna has a structure similar to that of the EFC antenna illustrated in FIG. 13. A description will be given of the differences between an EFC antenna used in a transmitter/receiver of the embodiment and a capacitance-loaded antenna.

A capacitance-loaded antenna illustrated in FIG. 36 emits radio waves in directions $B_1$ and $B_2$ around a radiant element of the antenna. However, the antenna emits no radio waves in direction A, which serves as a null point. Electric fields generated around the antenna are examined in detail. Specifically, a radiated electric field attenuated in inverse proportion to the distance from the antenna, an induced electric field attenuated in inverse proportion to the square of the distance from the antenna, and an electrostatic field attenuated in inverse proportion to the cube of the distance from the antenna are generated. Because the induced electric field and the electrostatic field are attenuated relative to the distance more rapidly than the radiated electric field, only the radiated electric field is discussed in general wireless systems, and the induced electric field and the electrostatic field are often neglected. Even in the case of the capacitance-loaded antenna illustrated in FIG. 36, an induced electric field and an electrostatic field are generated in direction A but are rapidly attenuated in air. Therefore, such an induced electric field and an electrostatic field are not actively employed in radio communication.

In the case of the EFC antenna illustrated in FIG. 1, in the case where a sufficient height is provided from the stub 103 on the circuit mounting surface of the printed circuit board 101 to the coupling electrode 108 connected thereto via the metal line 107, electrostatic coupling between the ground conductor 102 and the coupling electrode 108 is avoided, and the function as the EFC antenna (that is, the electrostatic coupling to an EFC antenna of a receiver which is not illustrated) is ensured. Note that, in the case where the height from the circuit mounting surface to the coupling electrode 108 is too large, the metal line 107 connecting the printed circuit board 101 to the coupling electrode 108 operates as an antenna and adversely emits unnecessary radio waves due to current flowing in the metal line 107. In this case, the attenuation of radio waves emitted by the resonating section of the EFC antenna behaving as an antenna relative to the distance is smaller than that of an electrostatic field or an induced electric field. It is thus difficult to suppress these radio waves to very weak radio waves where the strength of an electric field at a distance of 3 m from a wireless facility is less than or equal to a predetermined level. Therefore, the length of the metal line 107 is determined on the basis of the following conditions: the coupling to the ground conductor 102 is avoided while the characteristics as the EFC antenna are fully achieved; and the emission of unnecessary radio waves due to current flowing in the metal line 107 is suppressed (that is, the operation of the resonating section including the metal line 107 as an antenna is not so strong).

In the case of the EFC antenna in which the parallel inductor and the series inductor are configured as a distributed-constant circuit, size parameters which are regarded to influence the performance of the EFC antenna include the following: the width W of the stub; the length L1 of the stub; and the distance L2 from the tip of the stub (or the position of the through hole 106) to the mounting position of the coupling electrode 108 (or the metal line 107).

As has been described above, the length of the stub 103 is one-half the wavelength of an RF signal used. The mounting position L2 of the coupling electrode 108 is preferably the position at which the maximum amplitude of a standing wave can be obtained, that is, one-fourth the wavelength (see FIG. 2).

Figure 26:
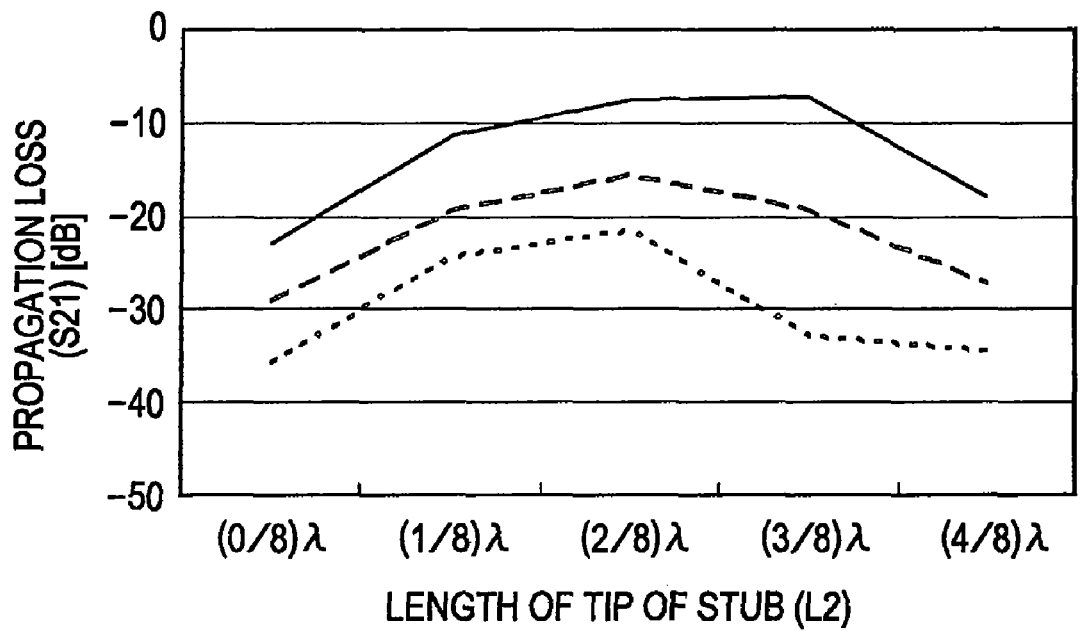
FIG. 26 is a graph of measured values of propagation losses obtained at every mounting position L2 of the coupling electrode 108 by changing the distance between coupling electrodes of a transmitter and a receiver.

The inventor of the present invention measured the propagation loss $S_{21}$ at every mounting position L2 of the coupling electrode 108 while changing the distance between coupling electrodes of a transmitter and a receiver. The inventor assumed that the size of the coupling electrode of each EFC antenna was 8 mm×8 mm, the height of the electrode (thickness of the metal line) was 3 mm, the size of the board was 20 mm×20 mm, the thickness of the board was 0.8 mm, and the dielectric constant of the board was 3.4. Also, the length L1 of the stub was set to one-half the wavelength of the operating frequency, and the width W of the stub was set to 1.8 mm. FIG. 26 shows the results of the measurement.

It is clear from FIG. 26 that the coupling between the EFC antennas becomes strong when the mounting position L2 of the coupling electrode 108 is one-fourth the wavelength, that is, when the coupling electrode 108 is mounted at a position at which the amplitude of the voltage of a standing wave generated in a short stub whose length is one-half the wavelength becomes maximum.

In general, metal hinders efficient radiation of radio waves emitted from an antenna. For this reason, it is not allowed to place metal such as ground near a radiant element of an antenna. In contrast, in the communication system according to the embodiment, the characteristics of the EFC antenna are not deteriorated even in the case where metal is placed facing the backside of the coupling electrode 108. By folding the stub and disposing the folded stub on the board, the EFC antenna can be made more compact than a known antenna. Since an electric field component (longitudinal wave component) $E_R$ causing vibration parallel to the direction of propagation has no polarization, predetermined level of communication quality can be maintained even in the case where the orientations of the EFC antennas are changed.

An antenna transmits a signal using a radiated electric field which is attenuated in inverse proportion to the distance. In contrast, the EFC antenna according to the embodiment transmits a signal mainly using an induced electric field which is attenuated in inverse proportion to the square of the distance and an electrostatic field which is attenuated in inverse proportion to the cube of the distance. Particularly in the case of an electrostatic field, the electric coupling rapidly weakens as the distance between the electrodes increases, leading to difficulty in performing communication. This means that this is suitable for communication over a very short distance using a very weak electric field.

Figure 25:
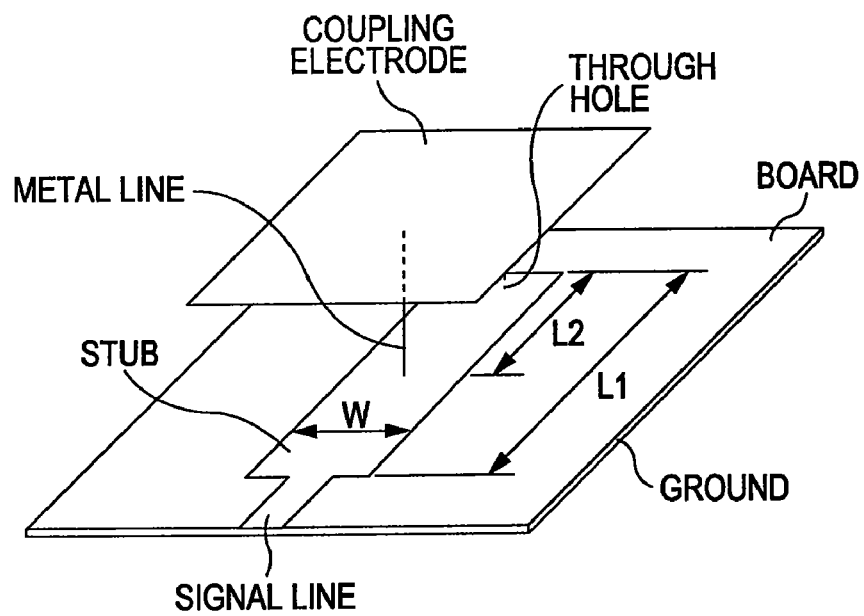
FIG. 25 illustrates size parameters of an EFC antenna in which a parallel inductor and a series inductor are included in a distributed-constant circuit.
Figure 27:
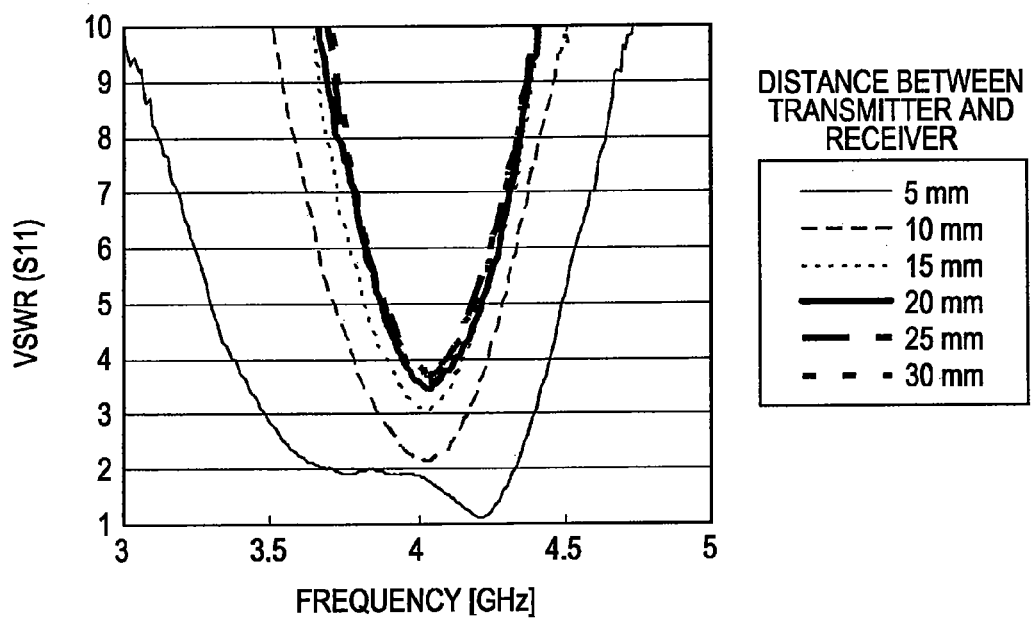
FIG. 27 is a graph of measured values of S parameter (reflection characteristic: voltage standing wave ratio (VSWR)) obtained by disposing two EFC antennas facing each other and changing the distance between coupling electrodes.
Figure 28:
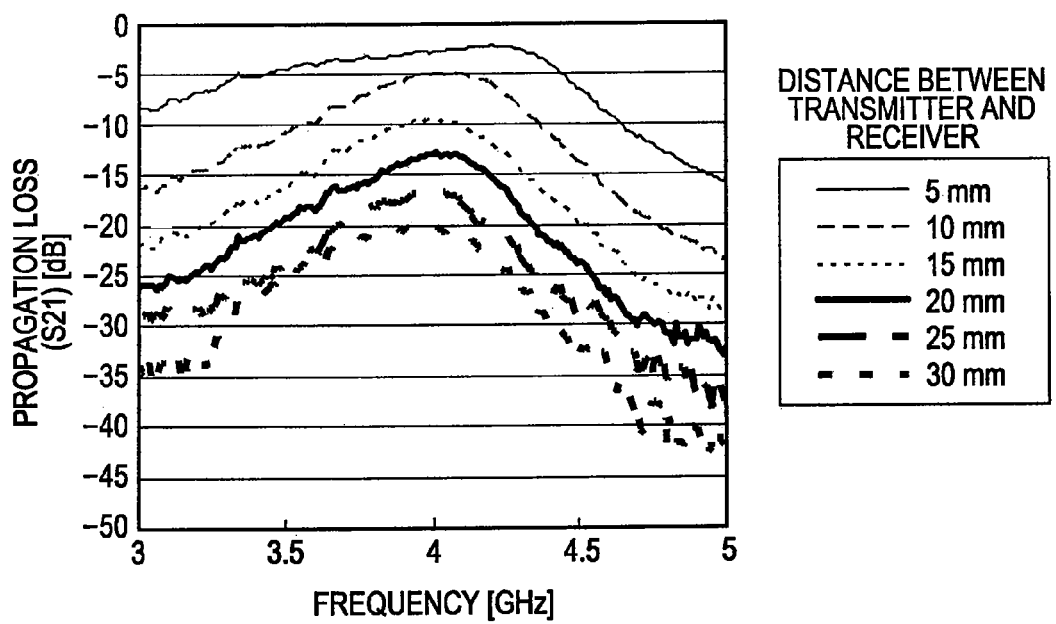
FIG. 28 is a graph of measured values of S parameter (propagation loss $S_{21}$) obtained by disposing two EFC antennas facing each other and changing the distance between coupling electrodes.

FIGS. 27 and 28 illustrate measured values of S parameters obtained by disposing two EFC antennas, illustrated in FIG. 25, facing each other, and changing the distance between coupling electrodes. The S parameters include a voltage standing wave ratio (VSWR) corresponding to a reflection characteristic $S_{11}$ of a signal which is emitted from a transmitting side and reflected from a receiving side back to the transmitting side; and a propagation loss $S_{21}$ of a signal which is emitted from the transmitting side and which reaches the receiving side. FIG. 27 illustrates the VSWR, and FIG. 28 illustrates the propagation loss $S_{21}$.

In general, the VSWR is recommended to be less than or equal to two. It is clear from FIG. 27 that, for EFC antennas operating around 4 GHz, in the case where the distance between the transmitter and the receiver is less than or equal to 10 mm, the VSWR becomes a small value and impedance matching is achieved. In this case, it is regarded that the coupling electrodes of the EFC antennas are coupled to each other through a quasi-electrostatic field and operate as a capacitor. In contrast, in the case where the distance between the transmitter and the receiver is greater than 10 mm, the VSWR becomes a relatively large value and impedance matching is not achieved. In this case, it is regarded that the two EFC antennas are coupled and transmit a signal mainly using a longitudinal-wave induced electric field.

It is clear from FIG. 28 that the value of the propagation loss $S_{21}$ becomes smaller as the distance between the transmitter and the receiver becomes larger.

Unlike antennas, EFC antennas have no polarization. A predetermined level of communication quality can thus be achieved even in the case where the orientations of the EFC antennas are changed (described above). The inventor of the present invention measured the propagation loss $S_{21}$ by changing the orientations of the EFC antennas and the relative positional relationship between the EFC antennas. More specifically, a transmission-side EFC antenna is placed at the position (0, 0) and is connected to one of two ports of a known network analyzer, and a reception-side EFC antenna is connected to the other port of the network analyzer. The propagation loss $S_{21}$ between the EFC antennas is measured by changing the position of the reception-side EFC antenna. It is assumed that the measurement frequency is 4 GHz.

Figure 29:
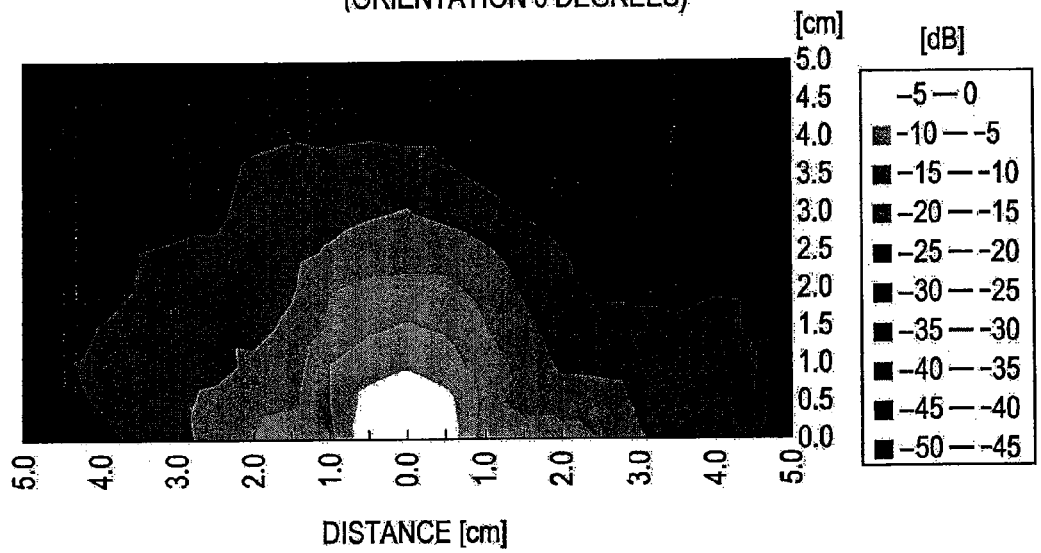
FIG. 29 illustrates measured values of the propagation loss $S_{21}$ between EFC antennas of a transmitter and a receiver obtained by disposing the EFC antennas oriented in the same direction (that is, 0 degrees)
Figure 30:
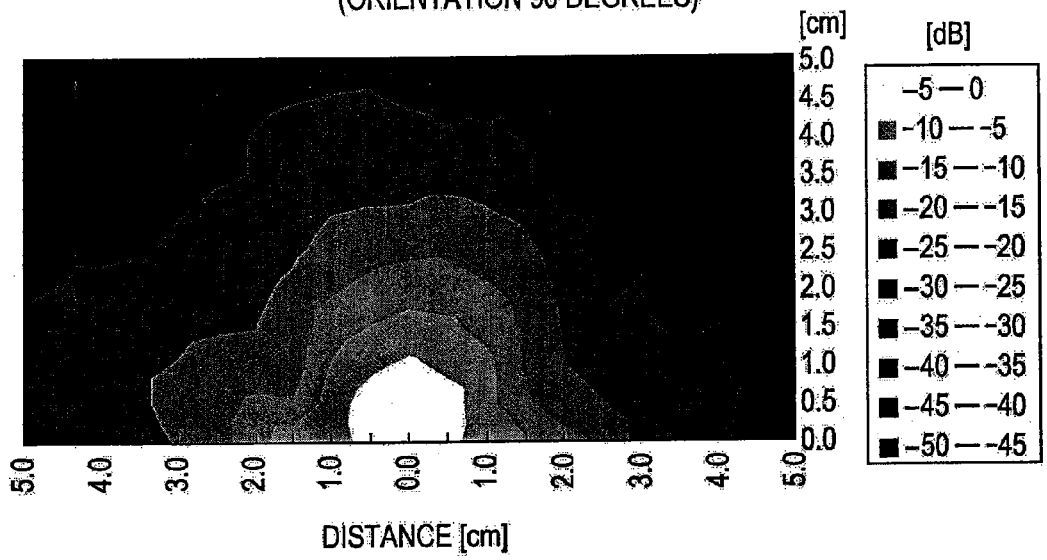
FIG. 30 illustrates measured values of the propagation loss $S_{21}$ between EFC antennas of a transmitter and a receiver obtained by disposing one of the EFC antennas to be oriented 90 degrees relative to the other EFC antenna.

FIG. 29 illustrates measured values of the propagation loss $S_{21}$ between the transmission-side EFC antenna and the reception-side EFC antenna obtained by disposing the EFC antennas oriented in the same direction (that is, 0 degrees). FIG. 30 illustrates measured values of the propagation loss $S_{21}$ between the EFC antennas obtained by rotating the orientation of the reception-side EFC antenna 90 degrees. By comparing the two diagrams, the measurement results show negligible differences before and after the rotation. That is, electric fields generated by the EFC antennas have no polarization.

For a comparison, the propagation loss $S_{21}$ was measured by changing the orientation of a known linear polarization antenna. More specifically, a transmission-side linear polarization antenna is placed at the position (0, 0) and is connected to one of two ports of a known network analyzer, and a reception-side linear polarization antenna is connected to the other port of the network analyzer. The propagation loss $S_{21}$ between the linear polarization antennas is measured by changing the position of the reception-side linear polarization antenna. It is assumed that the measurement frequency is 4 GHz.

Figure 31:
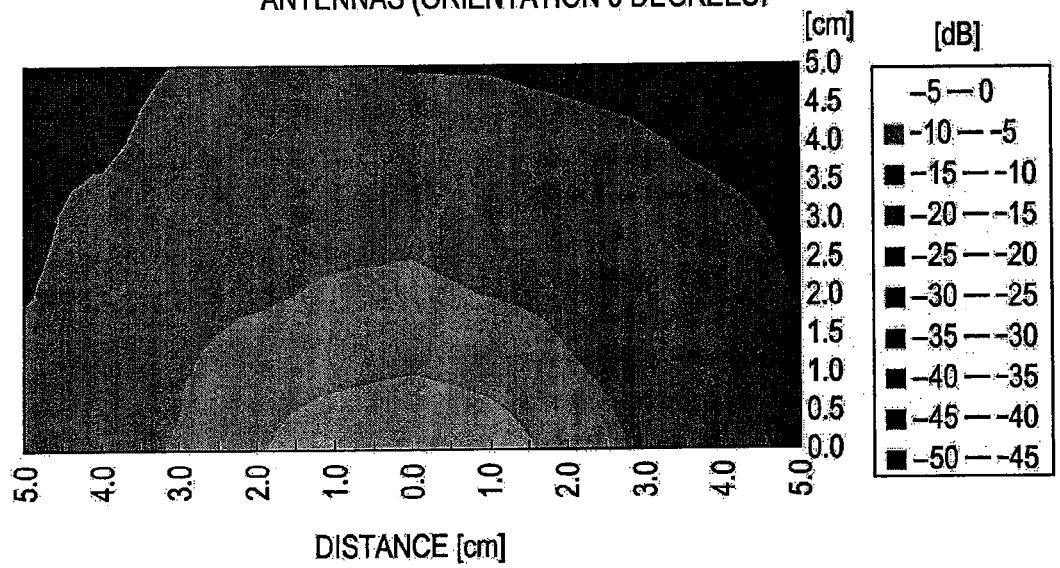
FIG. 31 illustrates measured values of the propagation loss $S_{21}$ obtained by disposing linear polarization antennas of a transmitter and a receiver oriented in the same direction (that is, 0 degrees)
Figure 32:
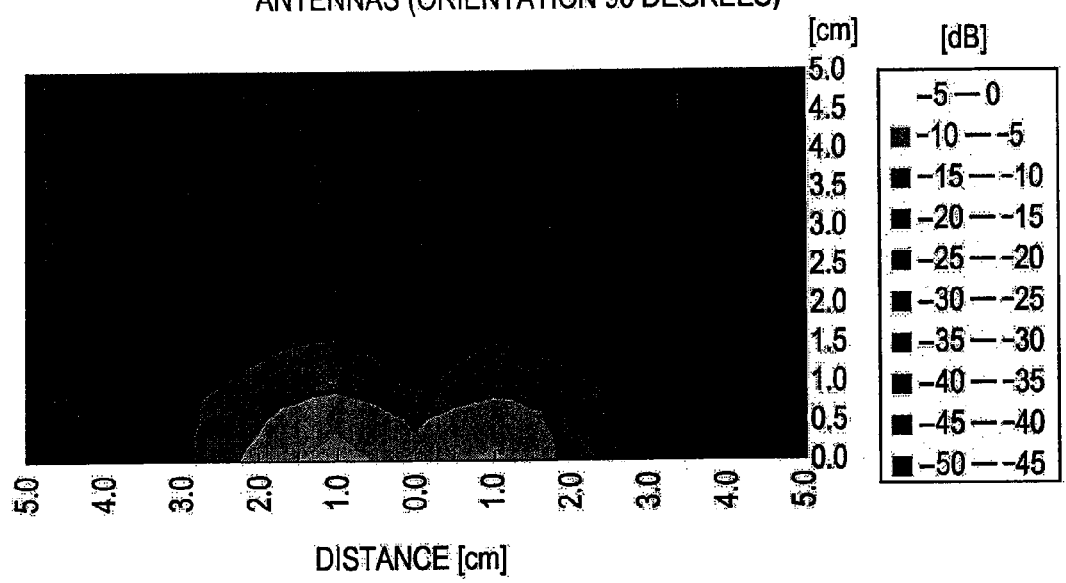
FIG. 32 illustrates measured values of the propagation loss $S_{21}$ obtained by disposing one of the linear polarization antennas to be oriented 90 degrees relative to the other linear polarization antenna.

FIG. 31 illustrates measured values of the propagation loss $S_{21}$ between the transmission-side linear polarization antenna and the reception-side linear polarization antenna obtained by disposing the linear polarization antenna oriented in the same direction (that is, 0 degrees). FIG. 32 illustrates measured values of the propagation loss $S_{21}$ obtained by rotating the orientation of the reception-side linear polarization antenna 90 degrees. By comparing the two diagrams, in the case where the orientation of the reception-side linear polarization antenna is rotated 90 degrees, that is, polarizations of the transmission-side and the reception side are orthogonal to each other, the propagation loss between the antennas is large, and the signal transmission strength is weak. That is, the communication quality of linear polarization antennas is not ensured in the case where the orientations of the linear polarization antenna are changed.

Figure 33:
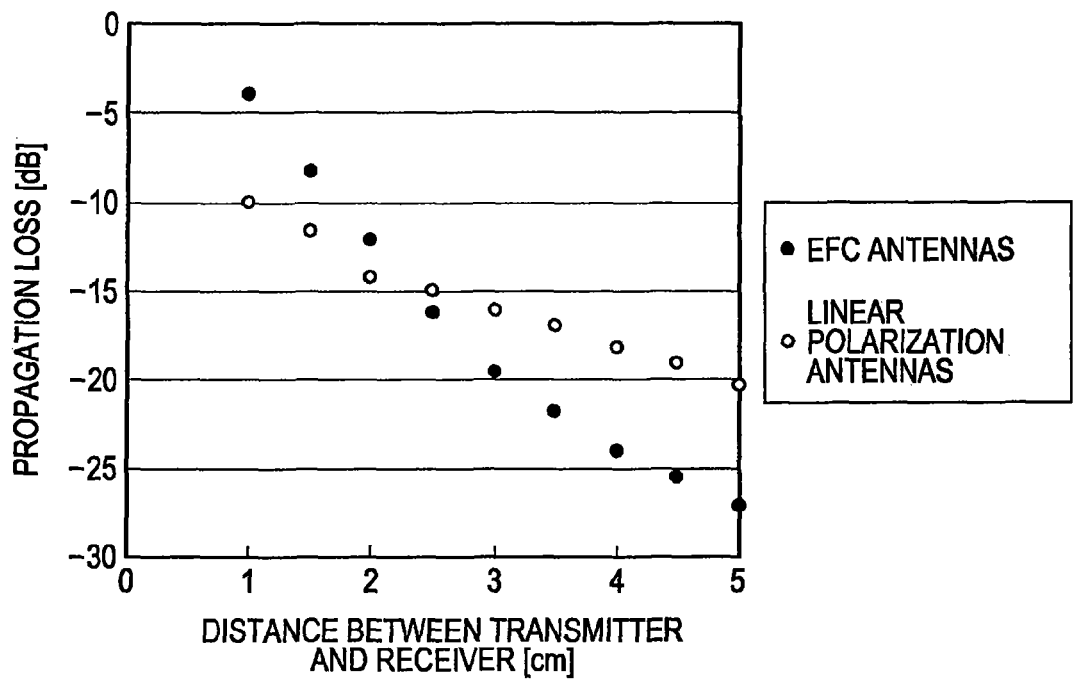
FIG. 33 illustrates measured values of the relationship between the distance between EFC antennas or linear polarization antennas (with the same direction of polarization) of a transmitter and a receiver and the propagation loss $S_{21}$.

FIG. 33 illustrates measured values of the relationship between the distance between EFC antennas or linear polarization antennas (with the same direction of polarization) of the transmission side and the reception side and the propagation loss $S_{21}$. It is assumed that the measurement frequency is 4 GHz. A radiated electric field is gradually attenuated in inverse proportion to distance. In contrast, the strength of an induced electric field and the strength of an electrostatic field are rapidly attenuated in inverse proportion to the square and the cube, respectively, of the distance (described above). Therefore, as illustrated in the diagram, the EFC antennas are coupled to each other more strongly at a short distance, and the attenuation according to distance is great.

Figure 34:
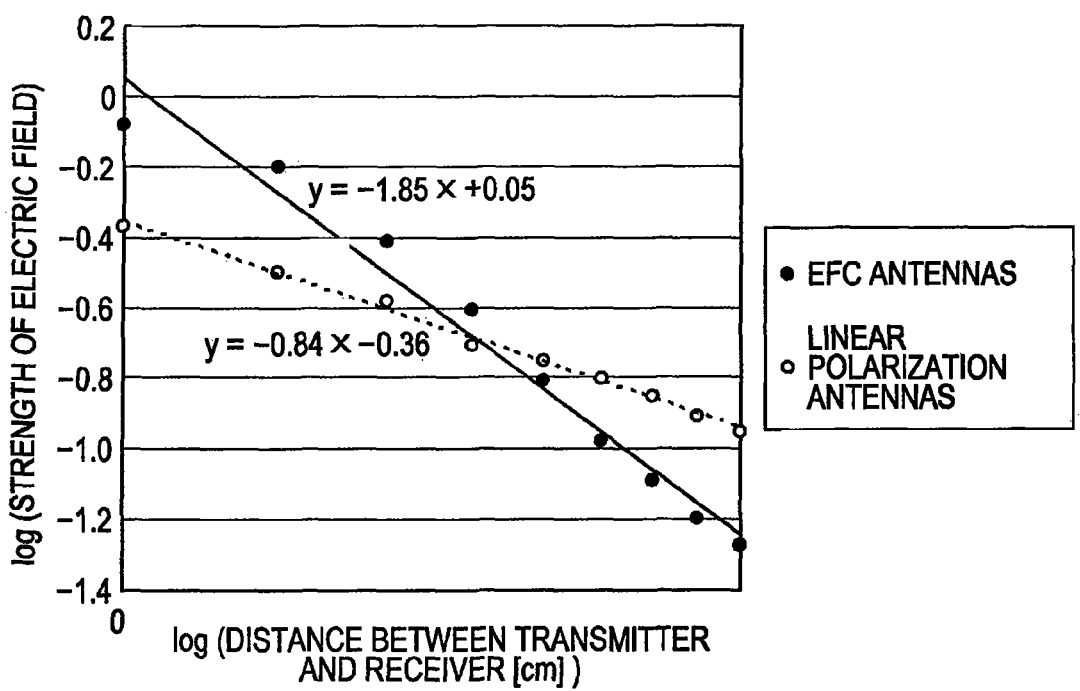
FIG. 34 shows, in which the logarithm of the square root of reception power (that is, the strength of an electric field) based on the measurement results shown in FIG. 33 is plotted in ordinate, and the logarithm of the distance between the transmitter and the receiver is plotted in abscissa, straight lines obtained by performing the first-order approximation of the measured values thereof using the least-squares method.

FIG. 34 shows, in which the logarithm of the square root of reception power (that is, the strength of an electric field) based on the measurement results shown in FIG. 33 is plotted in ordinate, and the logarithm of the distance between the transmitter and the receiver is plotted in abscissa, straight lines obtained by performing the first-order approximation of the measured values thereof using the least-squares method. Based on the gradient of each straight line, among electric fields generated by the EFC antennas, an induced electric field which is substantially proportional to the negative square of the distance is dominant in the case where the frequency is 4 GHz and the distance between the transmitter and the receiver is from 1 cm to 5 cm. In contrast, among electric fields generated by linear polarization antennas, a radiated electric field which is substantially proportional to the first power of the distance is dominant.

Figure 35:
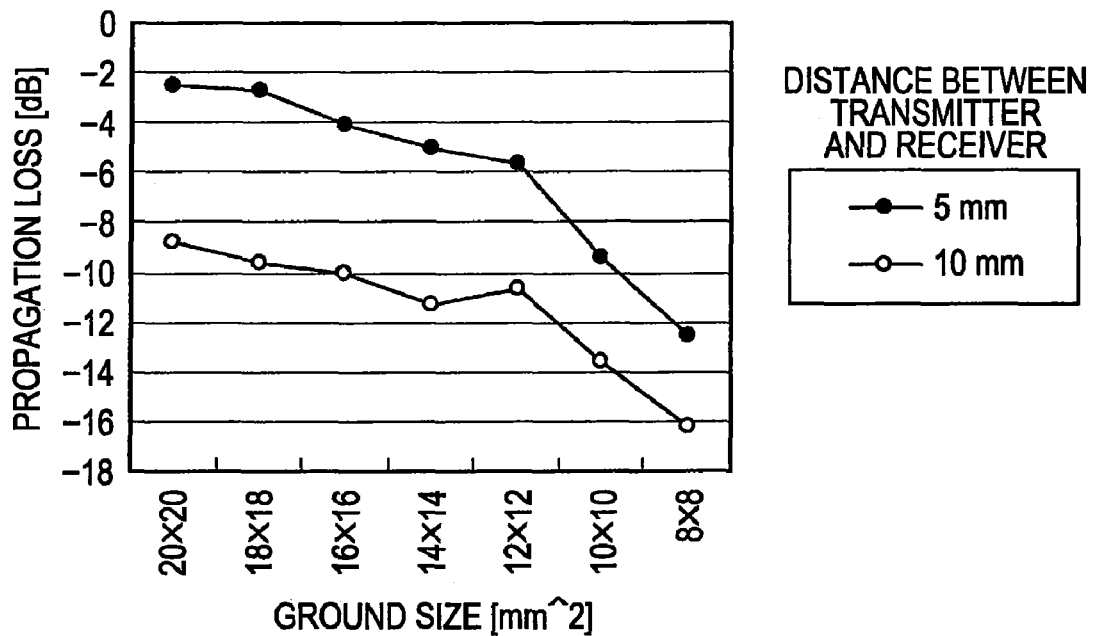
FIG. 35 illustrates the measurement results of the propagation loss $S_{21}$ between the EFC antennas obtained by changing the size of ground behind each EFC antenna.

It is not allowed to dispose a metal such as ground near a radiant element of an antenna. In contrast, the characteristics of the EFC antenna are not deteriorated even in the case where metal serving as ground is placed facing the backside of the electrode 108. FIG. 35 illustrates the measurement results of the propagation loss $S_{21}$ between the EFC antennas obtained by changing the size of ground behind each EFC antenna. Note that the measurement frequency is 4 GHz and the size of each coupling electrode is 8 mm×8 mm. The larger the size of ground behind the EFC antenna, the less the leakage of an electric field to the backside. It thus can be regarded the propagation loss $S_{21}$ in the front direction becomes greater. It is not necessary to infinitely increase the size of the ground. Practically, the size of the ground is sufficient when one side of the ground is greater than or equal to twice the size of the coupling electrode, that is, the area of the ground is greater than or equal to four times the area of the coupling electrode.

As has been already described, regarding the size of the stub 103, the coupling electrode is preferably disposed at the position one-fourth the wavelength at which the maximum amplitude of a standing wave can be achieved.

In the case where an operating frequency of a UWB low-band of 3.1 GHz to 4.9 GHz (described above) is assumed, the length of the waveform in free space is approximately 75 mm. Although the wavelength may be reduced due to the dielectric constant of the board, as illustrated in FIG. 1, in the case where the stub 103 is shaped as a straight line, the stub 103 is not accommodated in an area occupied by the coupling electrode 108. As a result, the mounting efficiency of the printed circuit board 101 may be reduced. By taking into consideration that the size of the coupling electrode 108 is approximately 10 mm×10 mm, the size of the coupling electrode 108 is not balanced with the size of the stub 103.

Therefore, the stub 103 may be folded such that the stub 103 can be accommodated in an area occupied by the coupling electrode 108 while maintaining the size which is one-half the wavelength. That is, a portion of the stub 103, which is a pattern on the printed circuit board 101, longer than the coupling electrode 108 may be folded under the coupling electrode 108, so that the EFC antenna can be made more compact than the size of a known EFC antenna.

Figure 3:
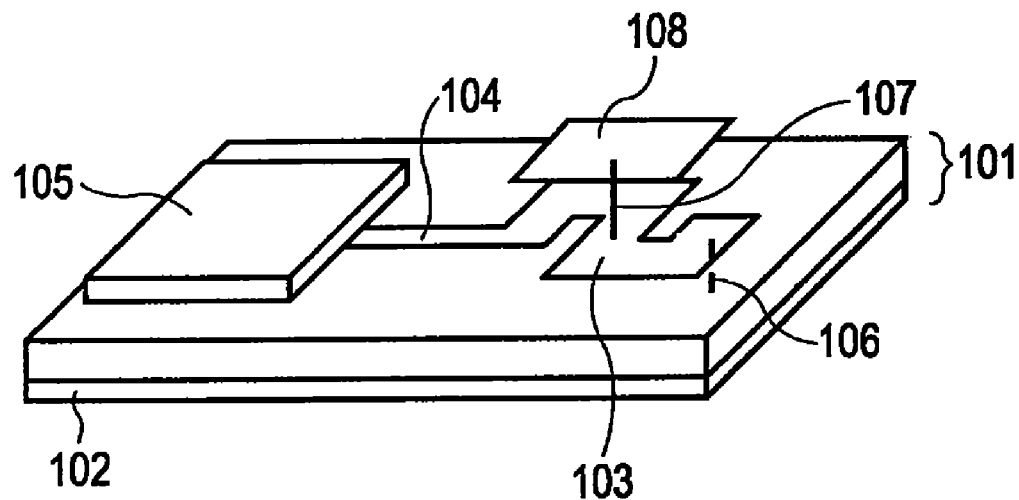
FIG. 3 is a diagram of the structure in which the stub 103 is folded under a coupling electrode 108.

An exemplary structure of the actual EFC antenna will be described with reference to FIGS. 3 to 5. FIG. 3 is a diagram of the structure in which the stub 103 is folded under the coupling electrode 108. In order to allow the structure to operate as an EFC antenna, the length of the stub 103 should be about one-half the wavelength, and the stub 103 is not necessarily shaped as a straight line. As illustrated in FIG. 3, the stub 103 can be folded, and hence the overall size of the EFC antenna can be reduced.

As has been described above, the height from the circuit mounting surface of the printed circuit board 101 to the coupling electrode 108 is important in regard to avoiding electric-field coupling between the ground conductor 102 and the coupling electrode 108.

Figure 4:
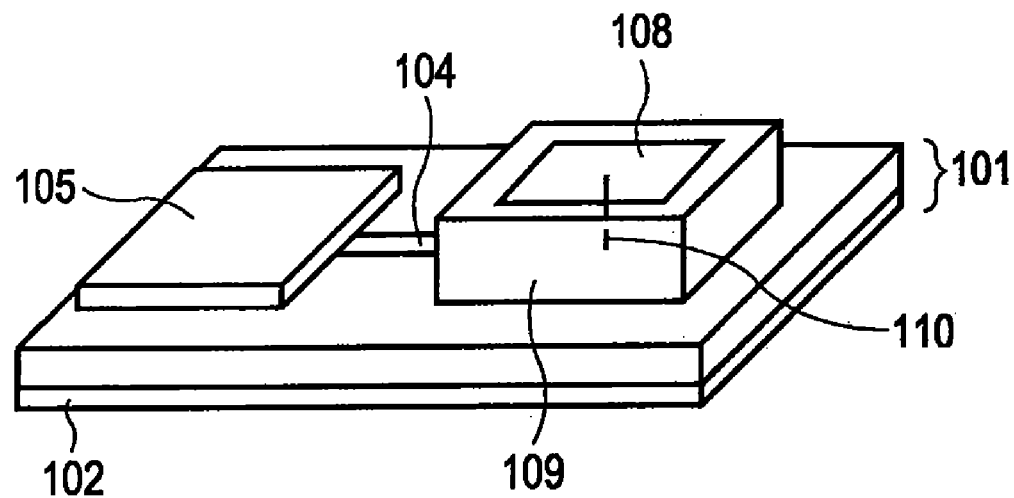
FIG. 4 is a diagram of the structure in which the coupling electrode 108 is supported using a spacer 109.

For example, as illustrated in FIG. 4, the coupling electrode 108 is placed on the upper surface of a spacer 109 with an appropriate height, and the coupling electrode 108 is connected to a central portion of the stub 103 via a through hole 110 penetrating through the spacer 109. The spacer 109 is made of electrically insulating material and plays the role of supporting the coupling electrode 108 at a desired height. The spacer 109 can be fabricated by forming a through hole in a dielectric column with a desired height, filling the through hole with conductor, and evaporating a conductive pattern serving as a coupling electrode on the upper end face of the dielectric column. The spacer 109 on which the coupling electrode is placed is mounted on the printed circuit board 101 by, for example, reflow soldering or the like.

Figure 5:
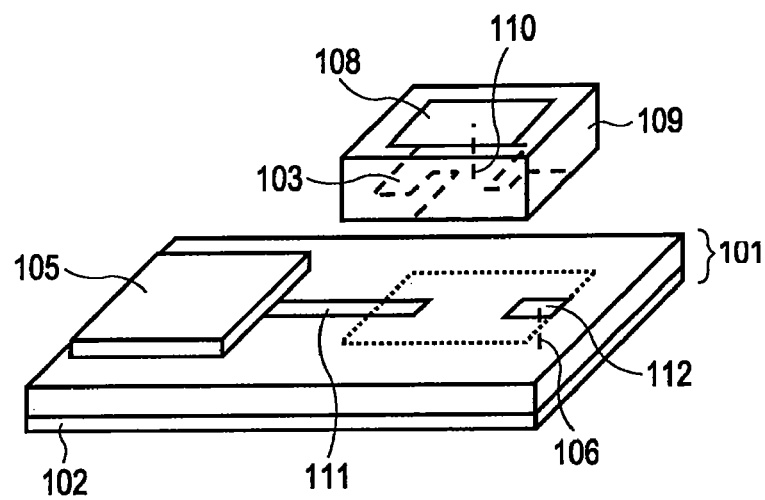
FIG. 5 is a diagram of an exemplary structure in which the spacer 109 is configured as a surface-mounted component of a printed circuit board 101.

FIG. 5 is a diagram of an exemplary structure in which the spacer 109 including the coupling electrode 108 and the through hole 110 serving as a metal line is mounted as a surface-mounted component on the printed circuit board 101.

In the illustrated example, the coupling electrode 108 is formed on the upper surface of the insulating spacer 109, and the folded stub 103 is formed on the lower surface of the spacer 109. For example, the spacer 109 can be fabricated by forming a through hole in a dielectric column with a desired height, filling the through hole with conductor, and evaporating a conductive pattern serving as the coupling electrode 108 and a conductive pattern serving as the stub 103 on the upper and lower end faces, respectively, of the dielectric column using an electroplating technique. In this case, the coupling electrode 108 on the upper end face is connected to a central portion of the stub 103 on the lower end face via the through hole 110 penetrating through the spacer 109.

Further, conductive patterns 111 and 112 adjoining two ends of the spacer 109 are formed on the printed circuit board 101. One conductive pattern 111 is a signal line extracted from the transmission/reception circuit module 105, and the other conductive pattern 112 is connected to the ground conductor 102 via the through hole 106 penetrating through the printed circuit board 101. The spacer 109 including the coupling electrode 108 and the folded stub 103 is mounted on the printed circuit board 101 by, for example, reflow soldering or the like.

In the example illustrated in FIG. 5, the coupling electrode 108 is evaporated on the upper end face of the spacer 109, and the stub 103 is evaporated on the lower end face of the spacer 109. As a modification, only the coupling electrode 108 may be evaporated on the spacer 109, and the stub 103 may be provided as a conductive pattern on the printed circuit board 101. At the time the spacer 109, is surface-mounted, the coupling electrode 108 and the stub 103 may be connected to each other via the through hole 110 in the spacer 109.

In the exemplary structures of the EFC antenna illustrated in FIGS. 4 and 5, the spacer 109 is made of an insulating material (described above). In the case where a material with a high dielectric constant is used, the length corresponding to the wavelength actually becomes shorter due to the wavelength shortening effect. As a result, the size of the stub 103 and the size of the coupling electrode 108 can be made more compact.

The height of the spacer 109 (that is, the length of the through hole 110) corresponds to the height from the circuit mounting surface of the printed circuit board 101 to the coupling electrode 108. The spacer 109 plays the role of avoiding electric-field coupling between the coupling electrode 108 and the ground 102 and the role of allowing the through hole 110 to function as a series inductor. By appropriately adjusting the height of the spacer 109 in accordance with the operating wavelength, the through hole 110 functions as a series inductor, the electric-field coupling between the ground 102 and the coupling electrode 108 is avoided, and the function as the EFC antenna can be ensured. By appropriately adjusting the height of the spacer 109 in accordance with the operating wavelength, the through hole 110 has an inductance and substitutes for the series inductor 12 illustrated in FIG. 13. Note that, when the height of the spacer 109 is large, that is, the distance from the circuit mounting surface of the printed circuit board 101 to the coupling electrode 108 is so long relative to the operating wavelength that the distance is difficult to be ignored, the through hole 110 operates as an antenna and adversely emits unnecessary radio waves due to current flowing therein.

In a communication scheme employing electric-field coupling using an electrostatic field or an induced electric field, fine alignment of coupling electrodes of a transmitter and a receiver is necessary to induce electrostatic coupling between the coupling electrodes. During data communication, the positions of the coupling electrodes are necessary to be maintained. A user often has difficulty in knowing in which portion of each device the coupling electrode should be placed, which portion of the device should be connected to the coupling electrode, or at what angle the electrodes should be placed facing each other in order to achieve the optimal communication state. For these reasons, the highest communication speed may not be achieved.

In order to solve this type of problem, a plurality of EFC antennas may be arranged in an array. In the case of radio communication, a parallel array of transmission antennas causes transmission power to be distributed among the antennas, and the output of each antenna is reduced. Therefore, antennas that do not contribute to communication uselessly consume transmission power. In contrast, in a communication scheme using electric-field coupling, EFC antennas can be designed such that only an EFC antenna coupled to another EFC antenna may transmit an RF signal, and the remaining other EFC antennas may be regarded substantially as open ends. That is, even in the case where a plurality of EFC antennas is arranged in an array, the problem of wasting transmission power by EFC antennas which are not coupled to an EFC antenna of a communication partner is not serious. Since each of the EFC antennas according to the embodiment of the present invention operates over a wideband, even in the case where the EFC antennas are arranged in an array and used at the same time in a wideband communication system, the communication system can remain operating effectively over a wideband.

Figure 9:
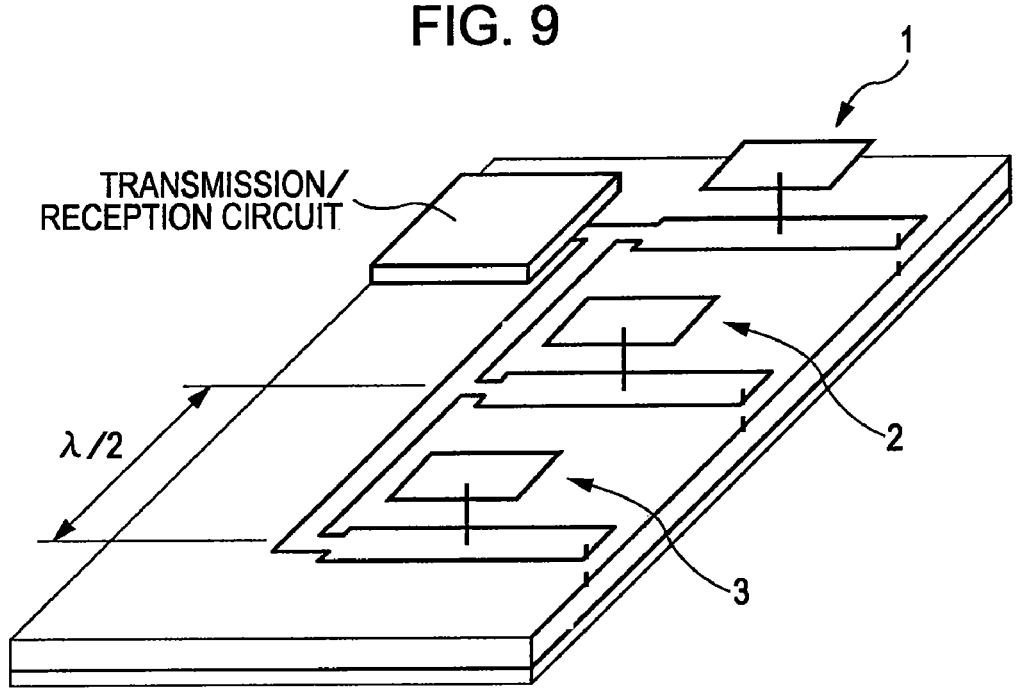
FIG. 9 is a diagram of the structure in which a plurality of EFC antennas shown in FIG. 1 is disposed on a printed circuit board.
Figure 10:
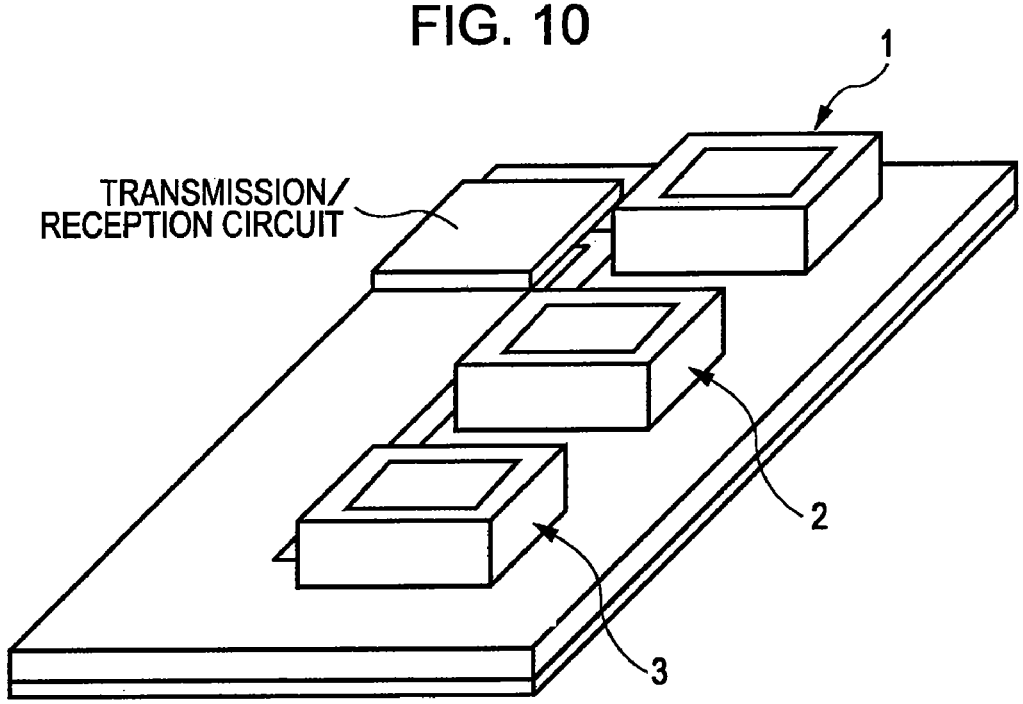
FIG. 10 is a diagram of the structure in which a plurality of EFC antennas shown in FIG. 4 or 5 is disposed on the printed circuit board.

FIG. 9 is a diagram of the structure in which a plurality of EFC antennas shown in FIG. 1 is disposed on a printed circuit board. Ends of stubs of the EFC antennas are connected in parallel to one transmission/reception circuit module via a signal line. FIG. 10 is a diagram of the structure in which a plurality of EFC antennas shown in FIG. 4 or 5 is disposed on the printed circuit board.

Of three EFC antennas 1 to 3 illustrated in the drawings, only an EFC antenna which is coupled to an EFC antenna of a communication partner transmits an RF signal, and the remaining EFC antennas serve as open ends. For example, in the case where only the EFC antenna 2 illustrated in the drawings is coupled to an EFC antenna of a communication partner (not shown), an output signal from the transmission/reception circuit module is not supplied to the EFC antenna 1, but the output signal passes through the EFC antenna 2 and reaches the EFC antenna of the communication partner.

Some of output signals from the transmission/reception circuit module pass through the EFC antenna 2 along the signal line and reach the EFC antenna 3, and are reflected from the EFC antenna 3 back to the EFC antenna 2. In order to avoid interference between the original signals and the reflected signals, the length of a signal line connecting between the EFC antennas is preferably an integral multiple of one-half the wavelength, or the difference between the lengths of the signal lines connecting between the transmission/reception circuit module and the corresponding EFC antennas is preferably an integral multiple of one-half the wavelength. Accordingly, compared with the case in which a signal from the transmission/reception circuit module is simply distributed by a distributor among the EFC antennas and supplied to the EFC antennas, a signal can be supplied only to an EFC antenna which is coupled to an EFC antenna of a communication partner. Therefore, a signal can be selectively and effectively transmitted.

Figure 11:
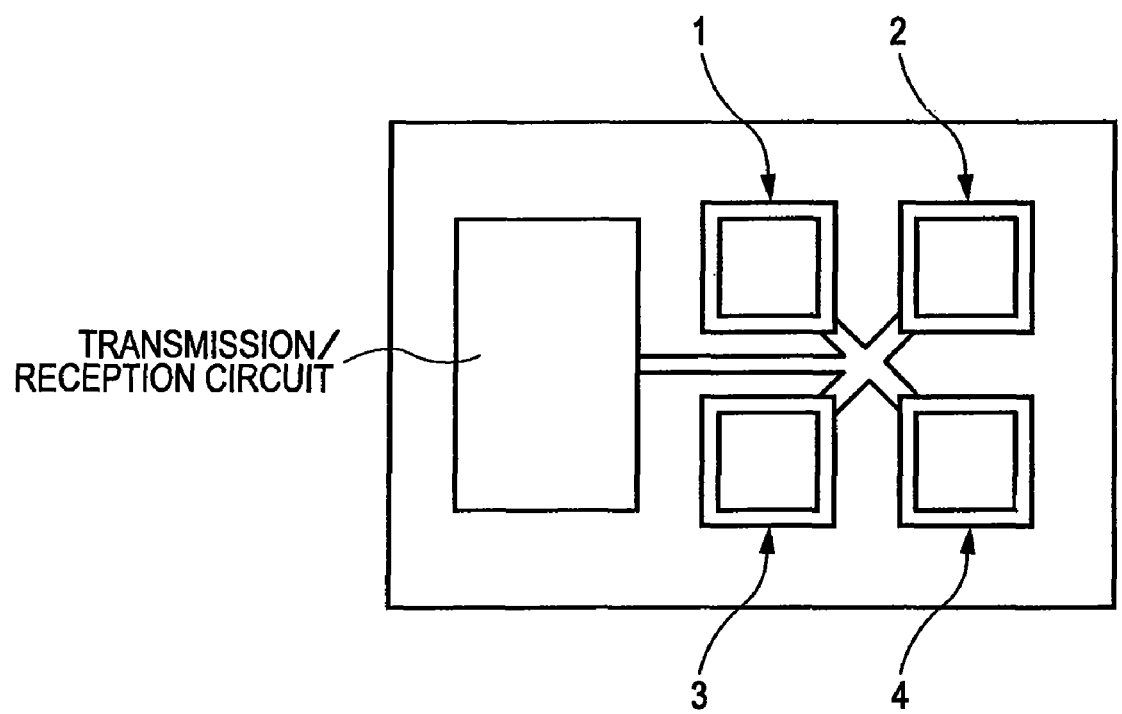
FIG. 11 is a diagram of an exemplary arrangement of EFC antennas according to the embodiment of the present invention, which are mounted on a printed circuit board.

Instead of arranging the EFC antennas in an array as illustrated in FIGS. 9 and 10, a signal line originating from a single point can branch out in a star fashion for a plurality of EFC antennas, as illustrated in FIG. 11, and the EFC antennas can be placed at the tip of the branches. In the exemplary arrangement illustrated in FIG. 11, the length of a signal line connecting from the branching point to each EFC antenna is an integral multiple of one-half the wavelength, and, as a result, the difference between the lengths of the signal lines connecting between the transmission/reception circuit module and the corresponding EFC antennas is an integral multiple of one-half the wavelength. Therefore, interference between original signals supplied to an electrostatically-coupled EFC antenna and reflected waves can be suppressed.

Figure 12:
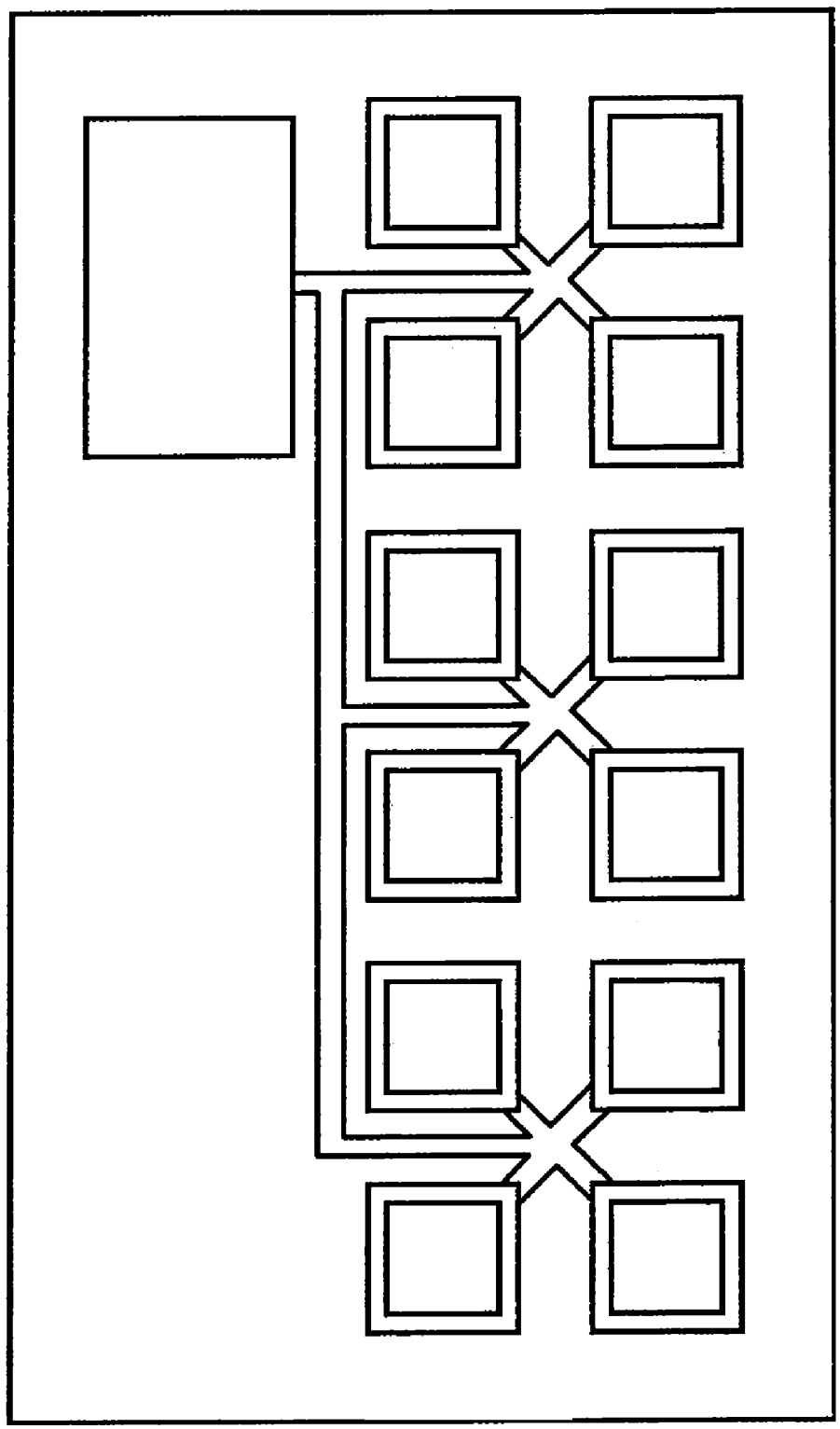
FIG. 12 is a diagram of an exemplary arrangement of EFC antennas according to the embodiment of the present invention, which are mounted on a printed circuit board.

Further, as illustrated in FIG. 12, the similar advantage of avoiding interference between original signals and reflected waves can be achieved by using an exemplary arrangement combining the exemplary arrangement illustrated in FIG. 10 and the branching arrangement illustrated in FIG. 11. As the number of EFC antennas used increases, the problem of alignment relative to the electrode of the communication partner is alleviated.

In the case where a plurality of narrow-band devices is placed in a casing of an apparatus, the overall system operates over a narrower band. It, is thus predicted that it is difficult to use a plurality of EFC antennas at the same time in a wideband communication system. In contrast, according to the embodiment, each EFC antenna operates over a wideband. In the case where the EFC antennas are arranged in an array as illustrated in FIGS. 9 to 12 and used at the same time in a wideband communication system, the communication system can remain operating effectively over a wideband.

FIGS. 4 and 5 illustrate exemplary structures of an EFC antenna which can be applied to the contactless communication system using an electric-field coupling scheme, which is illustrated in FIG. 14. However, the structure of the EFC antenna is not limited thereto.

Figure 37:
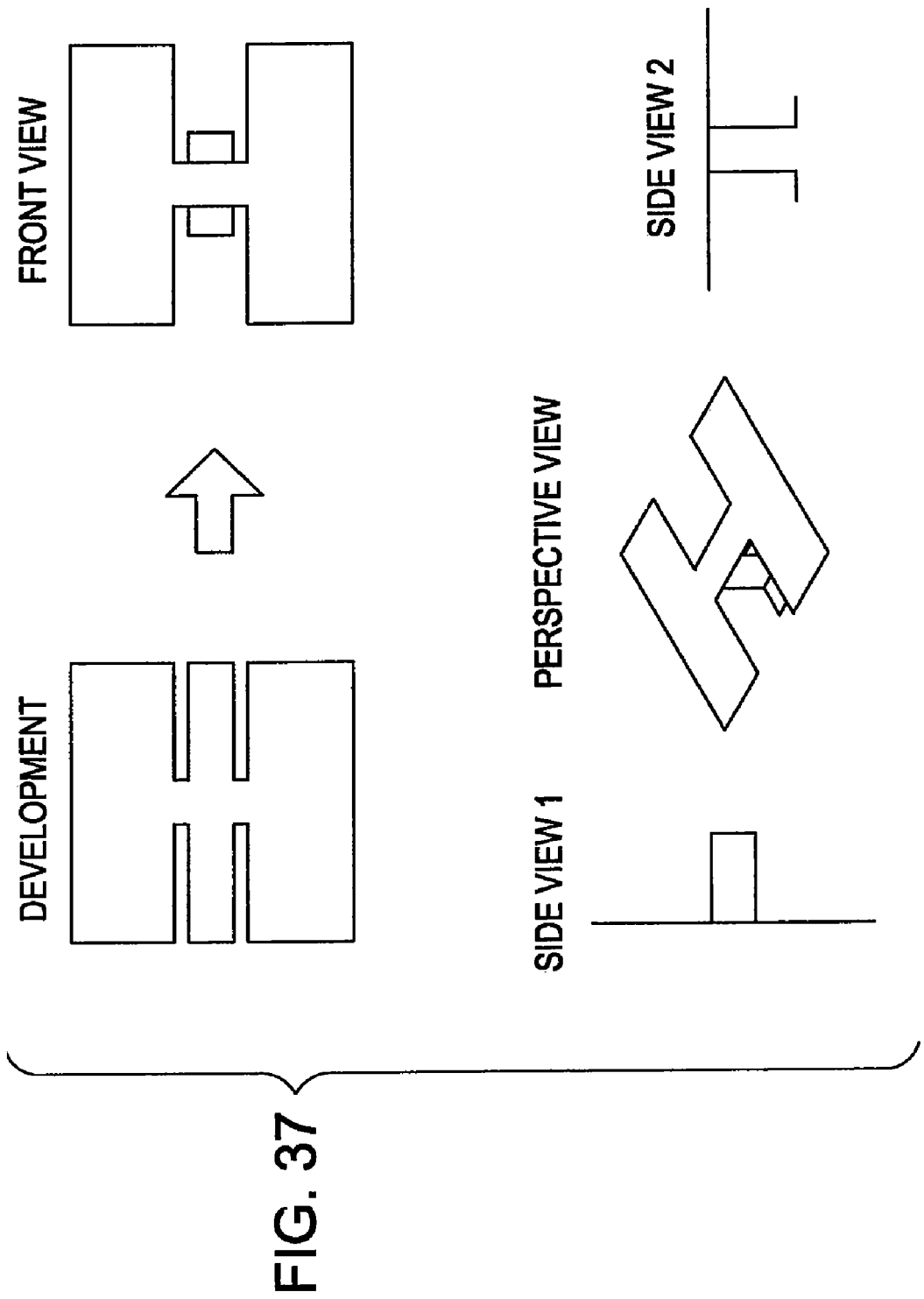
FIG. 37 illustrates an exemplary method of producing an electrode portion of an EFC antenna by performing sheet metal processing.
Figure 38:
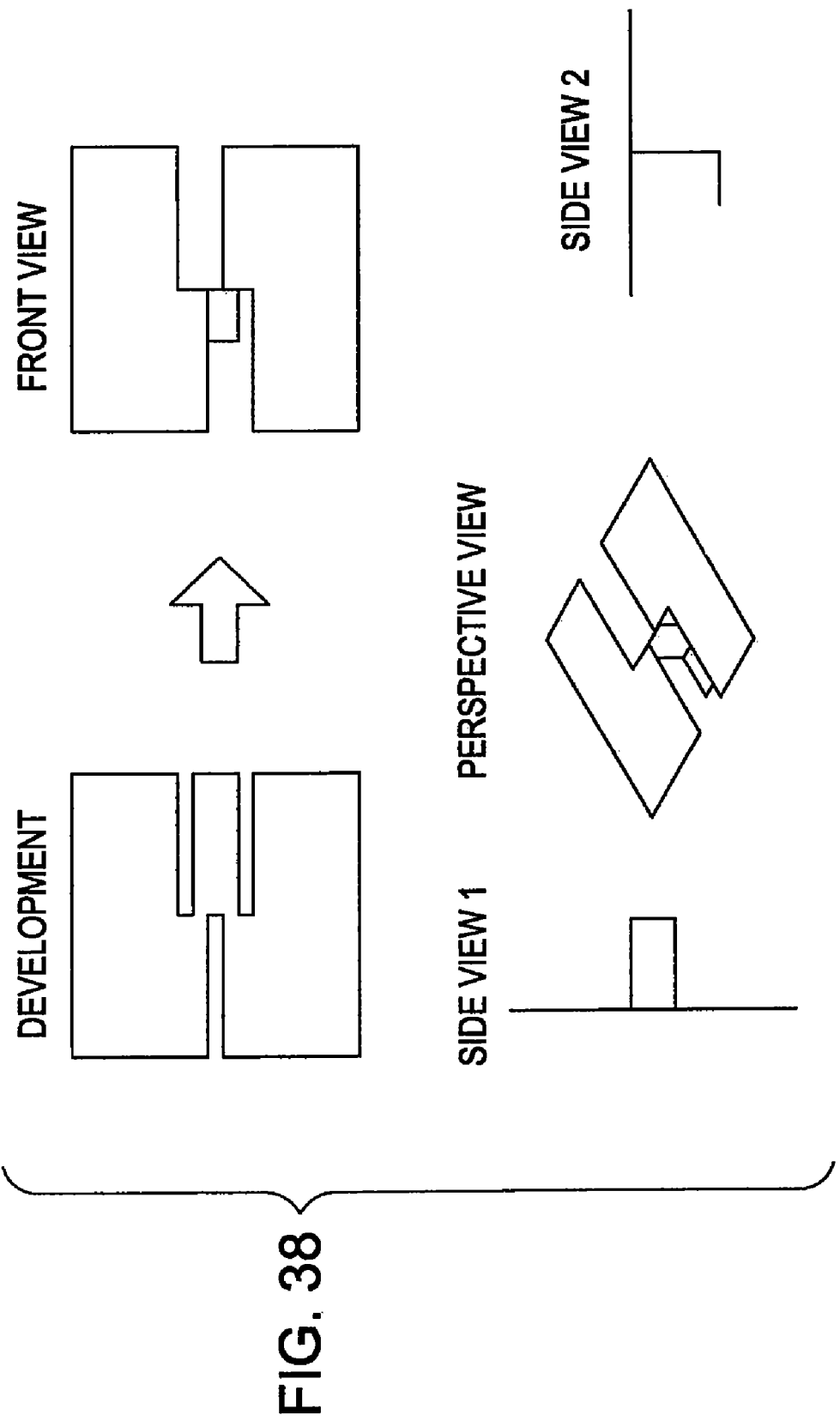
FIG. 38 illustrates another exemplary method of producing an electrode portion of an EFC antenna by performing sheet metal processing.
Figure 39:
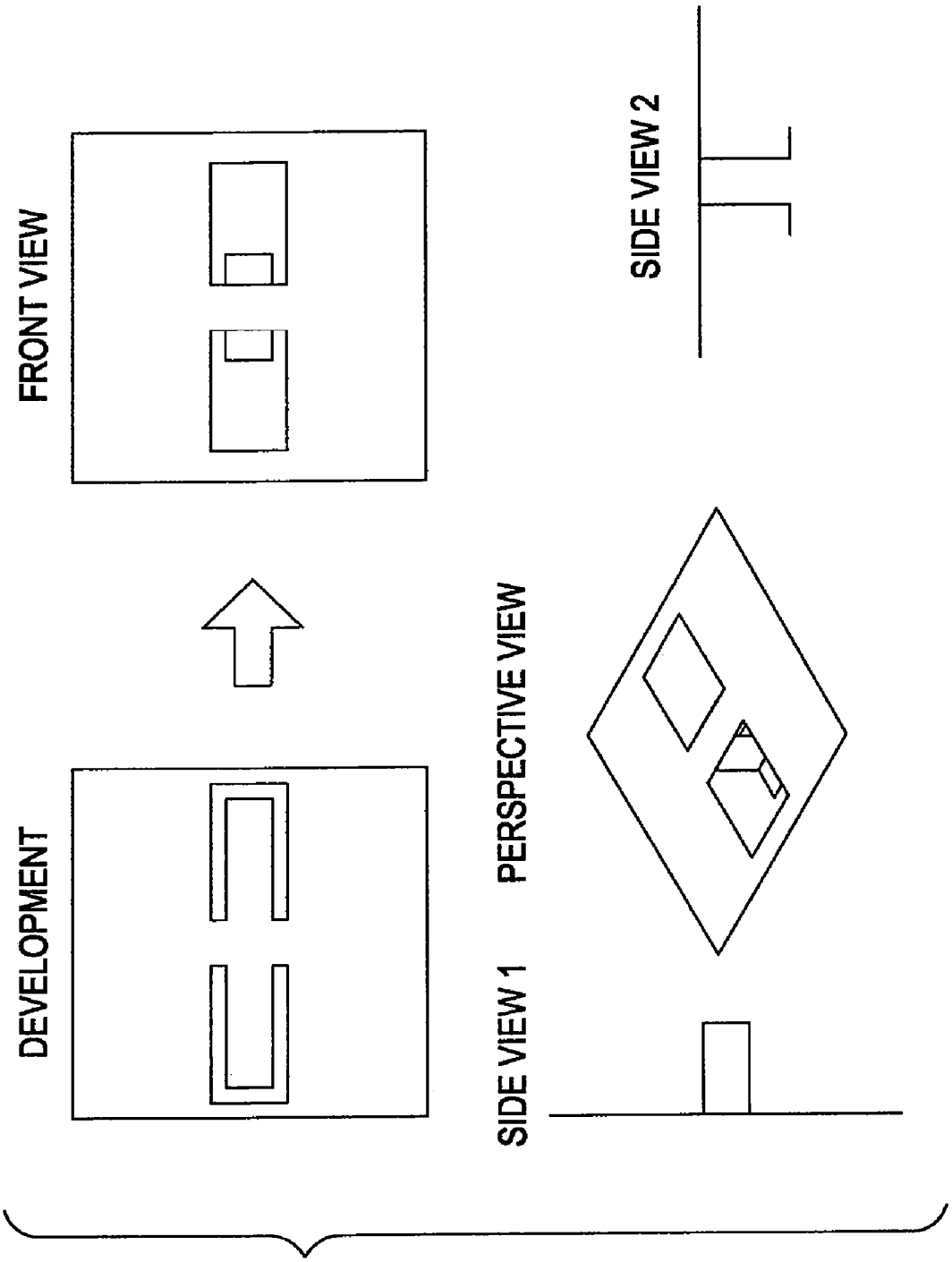
FIG. 39 illustrates another exemplary method of producing an electrode portion of an EFC antenna by performing sheet metal processing.

For example, an electrode portion of an EFC antenna can be easily produced at low cost by performing, for example, sheet metal processing. FIGS. 37 to 39 illustrate methods of producing the same.

Referring to these drawings, a sheet metal made of copper or the like is punched to form a portion which will become a coupling electrode and a portion which will become a leg connecting the coupling electrode to an RF signal line:

Next, the sheet metal is bent to allow the leg portion to be bent substantially perpendicular to the coupling electrode portion, whereby the leg portion achieves a desired height. The desired height mentioned here corresponds to the size that can play both the role of avoiding coupling between the coupling electrode portion and ground and the role of enabling the leg portion to serve as a series inductor.

Figure 40:
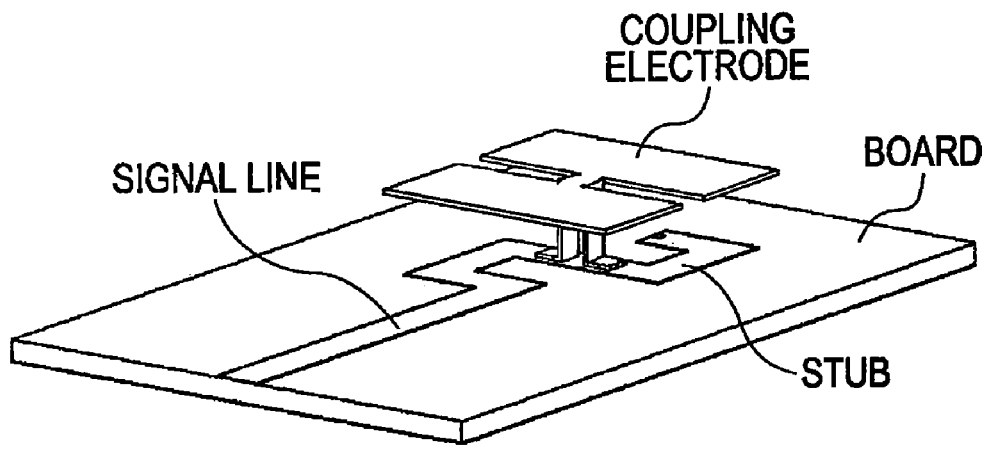
FIG. 40 illustrates the structure in which the coupling electrode illustrated in FIG. 37 or 39 is mounted onto a stub formed as a conductive pattern on a printed circuit board.

The coupling electrode fabricated in this manner is fixed to a corresponding position on, for example, a printed circuit board using a jig or the like (not shown) and mounted in place by reflow soldering or the like. FIG. 40 illustrates the structure in which the coupling electrode illustrated in FIG. 37 or 39 is mounted onto a stub formed as a conductive pattern on a printed circuit board.

The number of leg portions operating as series inductors may be two, as illustrated in FIGS. 37 and 39, or one, as illustrated in FIG. 38. Alternatively, three or more leg portions may be formed.

Figure 41:
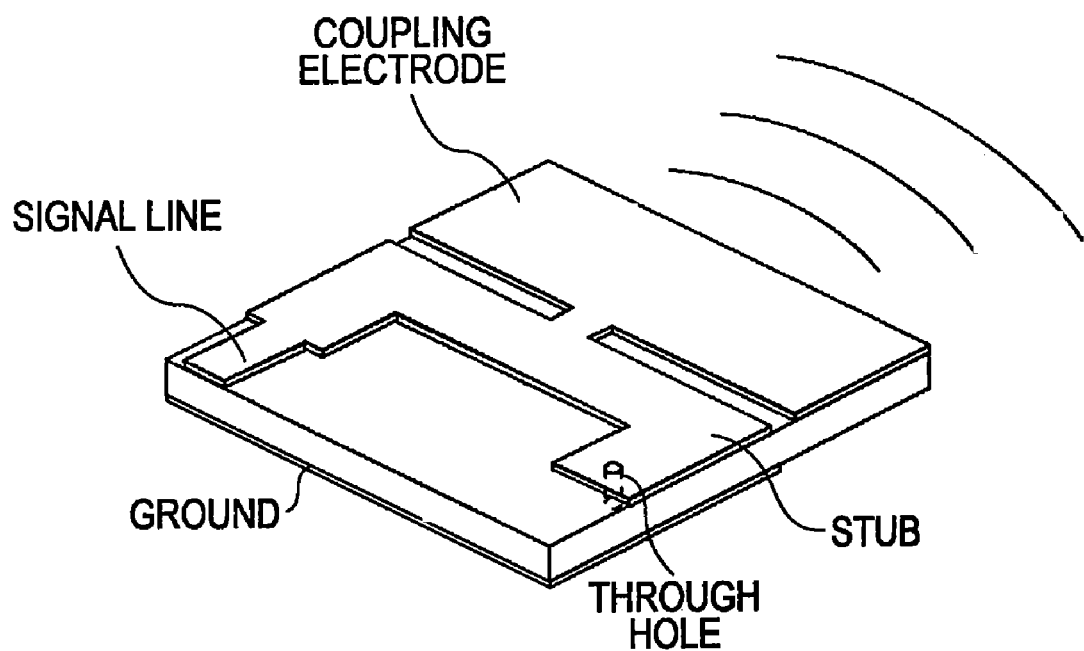
FIG. 41 illustrates an exemplary structure of an EFC antenna produced by forming a signal line, a resonating section, and a coupling electrode as a wiring pattern on one board.

Alternatively, an EFC antenna can be easily fabricated by forming a signal line, a resonating section, and a coupling electrode as a wiring pattern on one board. FIG. 41 illustrates an exemplary structure of such an EFC antenna. Note that no ground should be provided behind the coupling electrode. The EFC antenna illustrated is less advantageous than a three-dimensional EFC antenna in that the illustrated EFC antenna can only establish weaker coupling and its frequency band is narrower. However, the illustrated EFC antenna has advantages in terms of production cost and compact size (thinner in thickness).

As has been described above, in the communication system according to the embodiment, high-speed communication of a UWB signal can be implemented using the characteristics of an electrostatic field or an induced electric field. Since the strength of electrostatic coupling or induced-electric-field coupling greatly weakens in accordance with the communication distance, information can be prevented from being hacked by an unexpected communication partner, and confidentiality can be ensured. A user can intuitively select a communication partner by bringing the user's device physically closer to a desired communication partner with which the user wants to establish connection and exchanging information with the communication partner. Since no radio waves are emitted to the outside of the communication system according to the embodiment, the communication system does not affect other wireless systems. Since no external radio waves are received by the communication system, the communication system is not affected by external noise, and the reception sensitivity thereof is not deteriorated.

The foregoing description concerns the mechanism in which a signal is transmitted between a pair of EFC antennas in the contactless communication system using an electric-field coupling scheme, as illustrated in FIG. 14. The transmission of a signal between two devices necessarily involves the transfer of energy. Therefore, this type of communication system can be applied to electric power transfer. As has been described above, the electric field $E_R$ generated by the EFC antenna of the transmitter propagates as a surface wave in air. The receiver side can reliably obtain power by rectifying and stabilizing a signal received by the EFC antenna.

Figure 42:
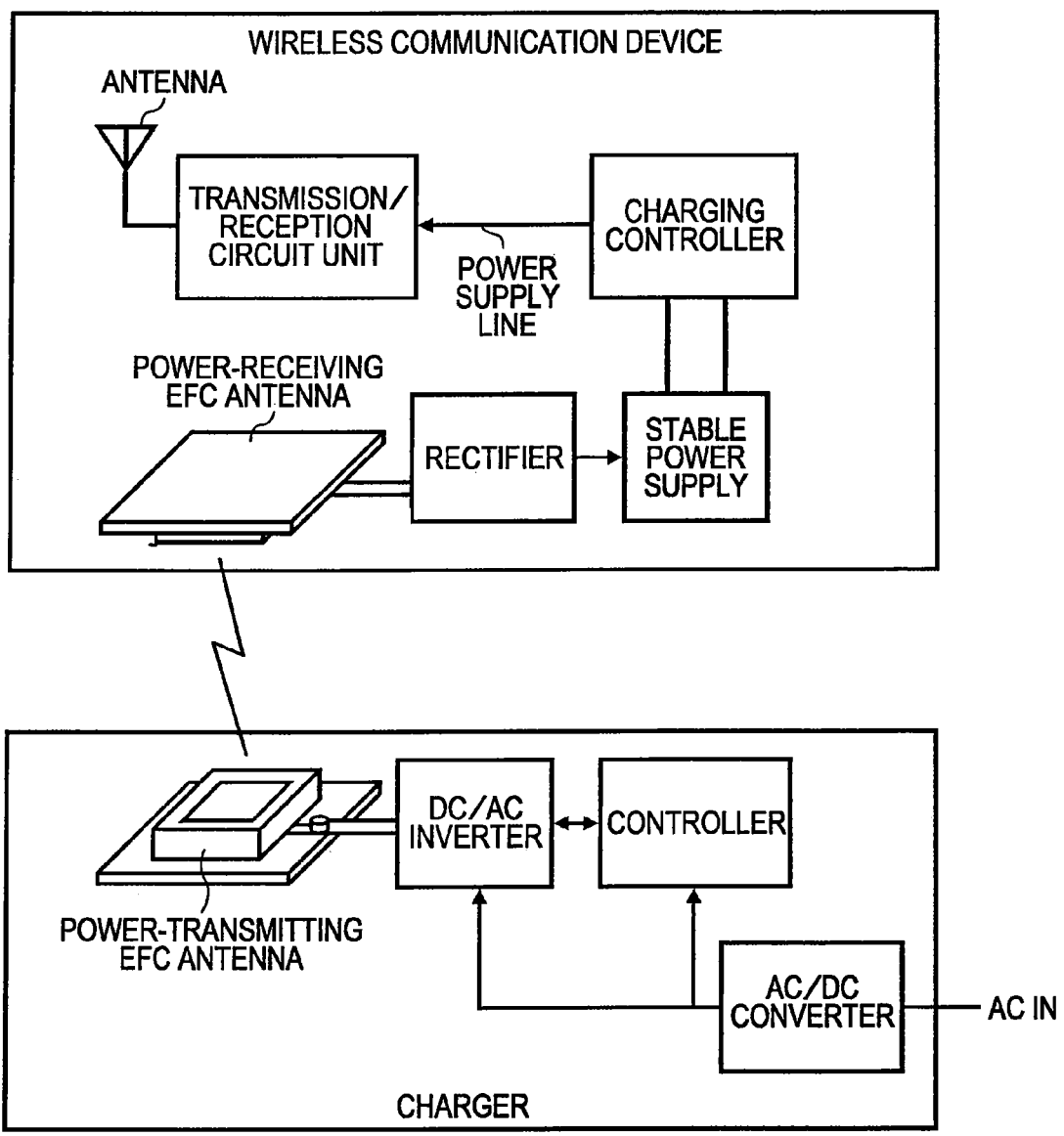
FIG. 42 is a diagram of an exemplary structure of the case where the EFC antenna illustrated in FIG. 1 is applied to electric power transfer.

FIG. 42 illustrates an exemplary structure of the case where the EFC antenna illustrated in FIG. 1 is applied to electric power transfer.

In the illustrated system, by bringing a charger connected to an alternating current (AC) power supply and a wireless communication device closer to each other, power is transmitted in a contactless manner to the wireless communication device via internal EFC antennas contained in the charger and the wireless communication device, and hence the wireless communication device is charged with power. The EFC antennas are used only to transfer electric power.

In the case where no power-receiving EFC antenna is located near the power-transmitting EFC antenna, most of the power input to the power-transmitting EFC antenna is reflected back to a direct-current (DC)/AC inverter. Therefore, the emission of unnecessary radio waves to the outside and the consumption of power beyond necessity can be suppressed.

Although the example illustrated in the diagram concerns the case where the wireless communication device is charged with power, a device charged with power is not limited to a wireless device. For example, electric power can be transferred in a contactless manner to a music player or a digital camera.

Figure 43:
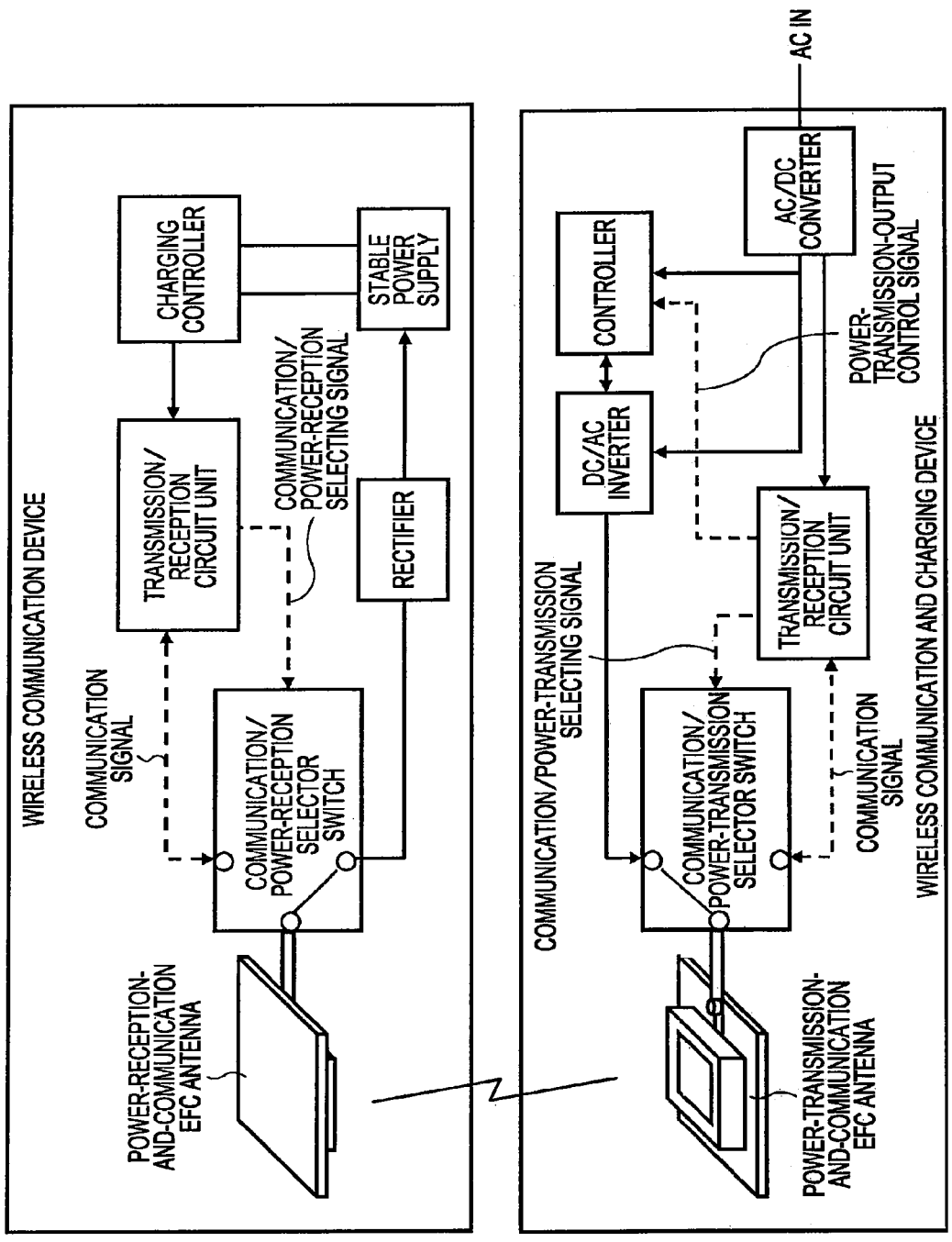
FIG. 43 is a diagram of another exemplary structure of the case where the EFC antenna illustrated in FIG. 1 is applied to electric power transfer.

FIG. 43 illustrates another exemplary structure of the case where the EFC antenna illustrated in FIG. 1 is applied to electric power transfer. In the illustrated system, the EFC antennas and the surface-wave transmission line are used to both transfer electric power and perform communication.

The timing to switch between communication and power transmission is controlled by a communication/power transmission-(reception)-switching signal sent from a transmission circuit unit. Alternatively, communication and power transmission can be alternately performed on a predetermined cycle. In this case, the power transmission output can be maintained at an optimum level by feeding back a charging status in addition to a communication signal to the charger. For example, when charging is completed, information indicating the completion is sent to the charger, thereby changing the power transmission output to zero.

Although the charger is connected to the AC power supply in the system illustrated in the drawings, the system may be applicable to the case where power is supplied from a cellular phone to another cellular phone with low battery power remaining therein.

The present invention has been described hereinabove in the context of specific embodiments thereof. It is to be understood, however, that modifications of or alternatives to the embodiments can be made by those skilled in the art without departing from the scope of the present invention.

In this specification, the embodiments applied to communication systems in which data, such as a 'UWB signal, is transmitted using electric-field coupling in a cableless manner have been mainly described. However, the scope of the present invention is not limited thereto. The present invention is similarly applicable to, for example, a communication system using an RF signal other than that in the UWB communication scheme or a communication system performing data transmission of a relatively low frequency signal using electric-field coupling.

In this specification, the embodiments applied to systems in which data is communicated between a pair of EFC antennas have been mainly described. Since the transmission of a signal between two devices necessarily involves the transfer of energy, this type of communication system can also be applied to electric power transfer.

In short, the present invention has been disclosed by way of examples, and the disclosure should not be construed as the restrictive one. Reference shall be made to the appended claims for delineation of the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
    a transmitter including a transmission circuit unit configured to generate a radio-frequency signal for transmitting data and an electric-field-coupling antenna configured to transmit the radio-frequency signal as an electrostatic field or an induced electric field; and
    a receiver including an electric-field-coupling antenna and a reception circuit unit configured to receive and process the radio-frequency signal received by the electric-field-coupling antenna,
    wherein the electric-field-coupling antennas of the transmitter and the receiver each include a coupling electrode and a resonating section including a distributed-constant circuit configured to strengthen electrical coupling between the coupling electrodes, and
    wherein the radio-frequency signal is transmitted by an electric-field longitudinal wave component of electric-field coupling between the electric-field-coupling antennas, facing each other, of the transmitter and the receiver.

2. The communication system according to claim 1, wherein the radio-frequency signal is an ultra-wideband signal using an ultra-wideband.

3. The communication system according to claim 1, wherein the resonating sections serve as a band-pass filter with a desired radio-frequency band as a passband between the electric-field-coupling antennas of the transmitter and the receiver.

4. A communication apparatus comprising:
    a communication circuit unit configured to process a radio-frequency signal for transmitting data; and
    an electric-field-coupling antenna configured to establish electric-field coupling to a communication partner facing the communication apparatus at a short distance,
    wherein the electric-field-coupling antenna includes a coupling electrode and a resonating section including a distributed-constant circuit configured to strengthen electrical coupling between the coupling electrode of the communication apparatus and a coupling electrode of the communication partner, and
    wherein the radio-frequency signal is transmitted by an electric-field longitudinal wave component of electric-field coupling to an electric-field-coupling antenna of the communication partner.

5. The communication apparatus according to claim 4, wherein the radio-frequency signal is an ultra-wideband signal using an ultra-wideband.

6. The communication apparatus according to claim 4, wherein the resonating section serves as a band-pass filter with a desired radio-frequency band as a passband with the electric-field-coupling antenna of the communication partner.

7. The communication apparatus according to claim 4, wherein the electric-field-coupling antenna is mounted on a printed circuit board on which a circuit module constituting the communication circuit unit configured to process the radio-frequency signal for transmitting data is provided.

8. The communication apparatus according to claim 7, wherein the distributed-constant circuit is configured as a stub including a conductive pattern disposed on the printed circuit board, and
    wherein ground is formed on another surface of the printed circuit board, a tip portion of the stub being connected to the ground via a through hole provided in the printed circuit board.

9. The communication apparatus according to claim 8, wherein the stub has a length approximately one-half the wavelength of an operating frequency, and the coupling electrode is disposed substantially at the center of the stub.

10. The communication apparatus according to claim 8, wherein the coupling electrode includes a conductive pattern evaporated on a surface of an insulating spacer, and, in the case where the spacer is mounted on the printed circuit board, the conductive pattern of the coupling electrode is connected substantially to the center of the stub via a through hole in the spacer.

11. The communication apparatus according to claim 10, wherein the stub has a folding shape accommodated in an area occupied by the spacer mounted on the printed circuit board, and the stub has a length approximately one-half the wavelength of an operating frequency.

12. The communication apparatus according to claim 10, wherein the stub includes a conductive pattern evaporated on another surface of the spacer.

13. The communication apparatus according to claim 7, wherein a plurality of electric-field-coupling antennas is connected to the communication circuit unit on the printed circuit board.

14. The communication apparatus according to claim 13, wherein a signal line connecting between the electric-field-coupling antennas has a length that is an integral multiple of one-half the wavelength.

15. The communication apparatus according to claim 4, further comprising electric-power generating means for generating electric power by rectifying the radio-frequency signal transmitted between the electric-field-coupling antennas.

* * * * *